(12) United States Patent
Allyn et al.

(10) Patent No.: US 7,302,650 B1
(45) Date of Patent: Nov. 27, 2007

(54) INTUITIVE TOOLS FOR MANIPULATING OBJECTS IN A DISPLAY

(75) Inventors: Barry Christopher Allyn, Mill Creek, WA (US); Mark Thomas Nelson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/699,401

(22) Filed: Oct. 31, 2003

(51) Int. Cl.
 *G06F 3/048* (2006.01)
(52) U.S. Cl. ........................ 715/859; 715/808; 715/792
(58) Field of Classification Search ................ 715/860, 715/862, 696, 859
 See application file for complete search history.

(56) References Cited

U.S. PATENT DOCUMENTS

| | | | |
|---|---|---|---|
| 5,396,590 A | 3/1995 | Kreegar | |
| 5,436,637 A | 7/1995 | Gayraud et al. | |
| 5,515,496 A * | 5/1996 | Kaehler et al. | 715/762 |
| 5,721,853 A * | 2/1998 | Smith | 715/803 |
| 5,742,779 A | 4/1998 | Steele et al. | |
| 5,861,889 A * | 1/1999 | Wallace et al. | 345/619 |
| 5,995,101 A * | 11/1999 | Clark et al. | 715/711 |
| 6,054,984 A * | 4/2000 | Alexander | 715/771 |
| 6,084,598 A * | 7/2000 | Chekerylla | 345/441 |
| 6,169,535 B1 * | 1/2001 | Lee | 345/660 |
| 6,426,745 B1 * | 7/2002 | Isaacs et al. | 345/419 |
| 6,462,763 B1 * | 10/2002 | Mostyn | 715/856 |
| 6,469,709 B1 * | 10/2002 | Sakai | 345/619 |
| 6,781,597 B1 * | 8/2004 | Vrobel et al. | 345/619 |
| 7,110,005 B2 * | 9/2006 | Arvin et al. | 345/619 |

OTHER PUBLICATIONS

Rathbone, Andy, Windows(r) 95 For Dummies (r), IDG Books Worldwide, Inc, p. 87.*

* cited by examiner

*Primary Examiner*—Kristine Kincaid
*Assistant Examiner*—Andrew Belousov
(74) *Attorney, Agent, or Firm*—Perkins Coie LLP

(57) ABSTRACT

A method and system for providing a user with user-friendly handles for manipulating graphics and other displayed objects using a pointer. An initial toolset of handles can evolve into a toolset with enhanced functionality. Selecting an object can invoke a first toolset. Pausing the pointer over an object for a preset length of time can invoke a second toolset with additional functionality. Continuing to maintain the pointer's stationary position over the object can invoke a third toolset. A rotation tool handle can rotate an object about an axis of rotation in response to pointer-based input. Moving a pointer over a rotation tool handles can invoke an axis-of-rotation tool for repositioning the axis of rotation using the pointer.

10 Claims, 18 Drawing Sheets

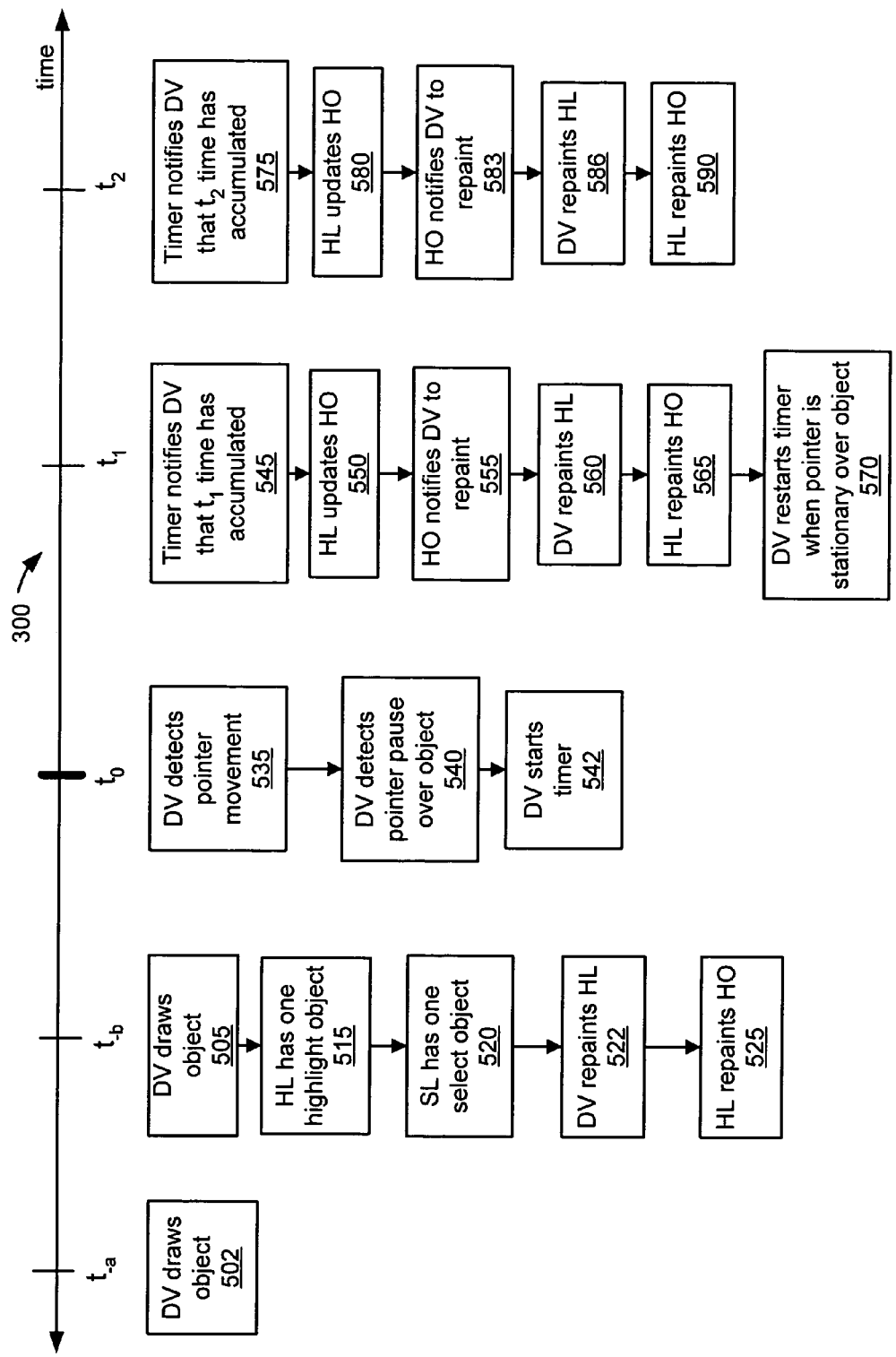

INTUITIVE TOOLS FOR MANIPULATING OBJECTS IN A DISPLAY

TECHNICAL FIELD

The present invention relates to tools for manipulating objects in an electronic document using a pointer. More specifically, it relates to handle-based tools with functionality that evolves in response to input from a user's pointer.

BACKGROUND OF THE INVENTION

Computer programs are widely available for creating drawings and other documents with graphic content. These programs incorporate a variety of tools to aid a user in creating and manipulating objects, such as graphics, icons, geometric shapes, images, and blocks of text, through a computer display. In contrast to traditional pencil and paper, a user need not be a skilled draftsman to create graphically sophisticated documents using drawing software. While computer-aided design ("CAD") software is specialized and often used by engineering professionals, a more diverse population of users works with general-utility software to create presentations, simple drawings, textual documents with integrated graphics, and a myriad of other vehicles of communication.

A software user can perform an array of operations on a graphical object displayed on a display device using a pointer that is under the control of a mouse, trackball, or stylus. Typical operations that users perform on graphical objects include resizing, rotating, adding text, moving, deleting, reshaping, curving a line, and altering a vertex. Many general-utility software packages feature graphical user interfaces ("GUI") that are adapted to simplify performing these operations so that user training is minimized. Nevertheless, the conventional tools that are available to a user for performing pointer-based operations on objects can be cumbersome and difficult to learn.

A handle-based tool can include one or more miniature graphics or icons that are presented on a display in association with a larger graphical object. Such graphics or icons are usually referred to as object "handles." A user can perform an operation on a larger graphical object by directing a pointer to a handle and clicking, dragging, or otherwise gesturing with the pointer. Conventional GUIs may include a menu, such as a toolbar or palette, through which a user can switch handles or otherwise change between tool modes.

To edit a graphical object, such as resizing, reshaping, or rotating the graphical object, a user can move the pointer to a toolbar at the top of the display to actuate one or more pull-down menus. Selecting an operation from the appropriate pull-down menu could invoke a set of object handles that is specific to that operation. One drawback of this approach is that it can be difficult to find a tool mode in the menu. Sometimes it is difficult for a user to know that the tool mode is even available. Consequently, a casual user usually needs to undertake a lengthy learning process to become comfortable with the tools available in most conventional drawing software packages. Some conventional drawing software packages employ balloon-based information tips to shorten the learning process. In such packages, a user hint may appear beside an icon or handle when a user pauses the pointer at that location. Many users find the appearance of balloon-based tips to be distracting.

In many instances, it would be desirable to provide tools that are intuitive and user-friendly for performing operations on objects using a pointer in a graphic-oriented computer display. Accordingly, there is a need in the art for a computer-based method and system for providing handle-based tools through which a user can switch between operational modes to perform diverse operations.

SUMMARY OF THE INVENTION

The present invention can include a method for invoking tools for manipulating an object on a display device, such as a computer generated graphic. Selecting the graphical object can invoke a toolset that includes handles. A user can manipulate the object with a pointer that is positioned with a mouse. The user can generate manipulation commands by positioning the pointer on the handles and activating a button on the mouse, for example clicking on the handles and/or gesturing with the pointer. The user can generate additional handle-based toolsets by positioning or moving the pointer over the object and/or its handles.

According to one exemplary aspect of the present invention, a user can invoke a toolset by interacting a pointer with an object and/or its handles. Such interaction can include positioning or moving a pointer directly over an object and/or its handles or over a region of a display that is adjacent and functionally coupled to the object. A user can pause a pointer over an object and/or its handles to invoke a handle-based toolset at the time of the pause. A user can maintain the pointer in a paused position over an object and/or its handles for a predetermined length of time, such as a threshold length of time, to invoke a handle-based toolset. A user can move a pointer over an object and/or its handles without a pause to invoke a handle-based toolset.

According to another exemplary aspect, the present invention can simultaneously display two or more sets of handles for a single object. A user can invoke handles sequentially. Accessibility to earlier handles can continue after the arrival of each new set of handles. The present invention can arrange the positions of the handles in multiple toolsets to provide ample working space for each handle. A first set of handles for an object can be displayed in close proximity to the object, for example contacting it. When a user invokes a second set of handles for the object, the present invention can reposition the first set of handles, for example moving them away from the object, to provide space for the second set of handles.

In another aspect of the present invention, interacting a pointer with an object or a handle that is associated with the object can invoke a second handle that supplements the functionality of the first handle. The second handle can refine an operation that is performed with the first handle. The second handle can also provide a finer degree of control over an operation or facilitate manipulating the object with more finesse.

In one aspect of the present invention, placing or moving a pointer over the rotation handle of an object can invoke an axis-of-rotation tool. A rotation handle can be operative to rotate an object in response to pointer input from a user. An axis-of-rotation handle can be operative to adjust the axis of rotation about which the rotation handle rotates an object.

The discussion of handle-based toolsets presented in this summary is for illustrative purposes only. Various aspects of the present invention may be more clearly understood and appreciated from a review of the following detailed description of the disclosed embodiments and by reference to the drawings and claims.

BRIEF DESCRIPTION OF THE DRAWINGS

FIG. 5 illustrates timing for exemplary process steps associated with the timing diagram illustrated in FIG. 3, according to one exemplary embodiment of the present invention.

DETAILED DESCRIPTION OF EXEMPLARY EMBODIMENTS

Introduction

A method and system for providing tools for manipulating objects in a display allows a user to perform operations intuitively and with minimal training. A user can invoke a handle-based toolset by selecting an object using a pointer. Pausing the pointer over the object can invoke a second handle-based toolset. Continuing to pause the pointer over the object can invoke a third handle-based toolset. When each new toolset is invoked, the existing handles can be automatically repositioned on the display to provide room for the new handles.

A toolset can include a rotation tool for a user to rotate an object based on pointer input. Placing the pointer over the rotation tool can invoke an axis-of-rotation tool that allows a user to adjust the axis about which the rotation tool rotates the object.

Turning now to the drawings, in which like numerals indicate like elements throughout the several figures, an exemplary operating environment and an exemplary embodiment of the present invention will be described in detail.

Exemplary Operating Environment

Figure 1:
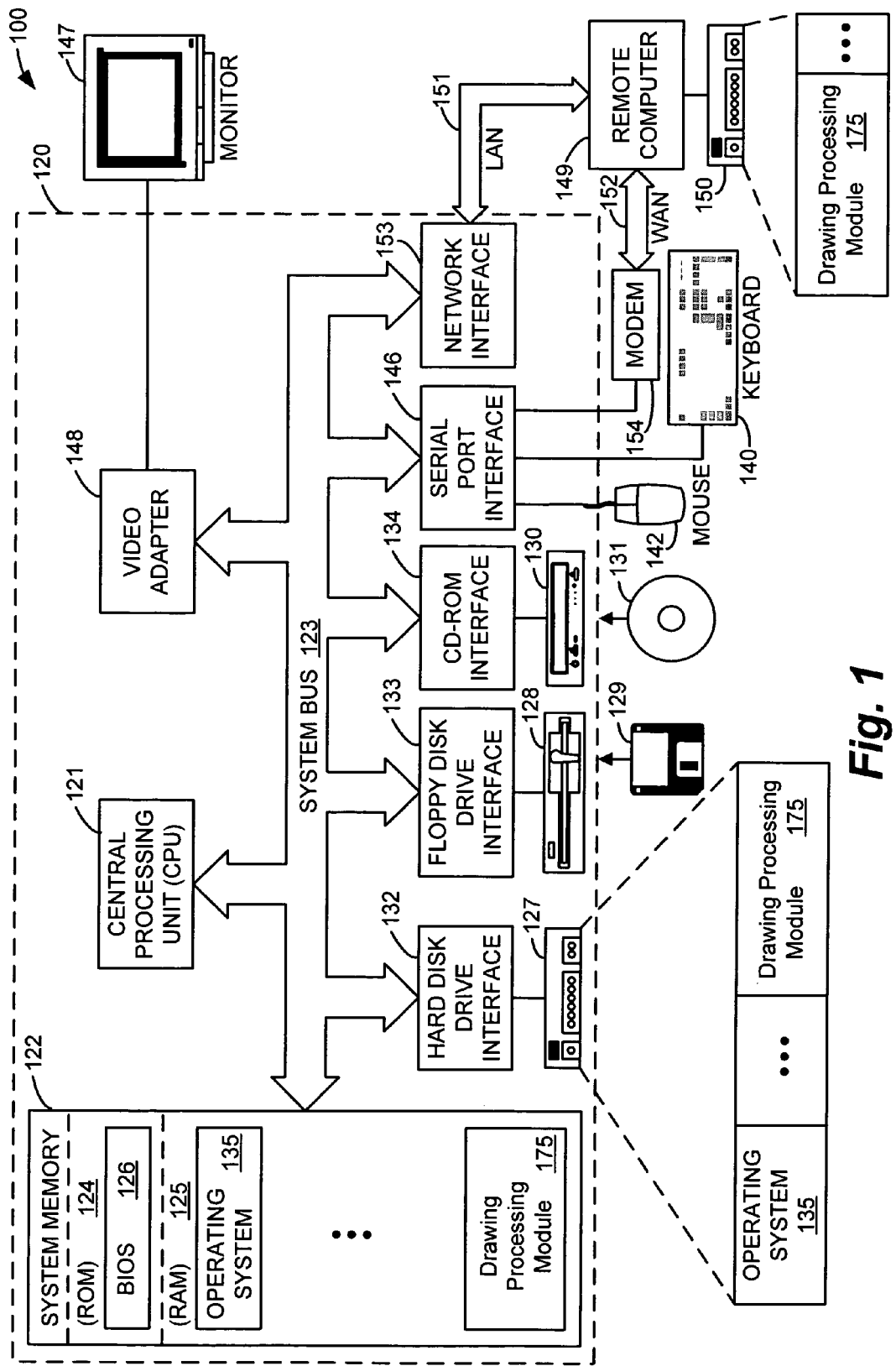
FIG. 1 is a functional block diagram illustrating an exemplary operating environment for implementing various embodiments of the present invention.

FIG. 1 illustrates an exemplary operating environment for implementation of the present invention. The exemplary operating environment includes a general-purpose computing device in the form of a conventional personal computer 120, as exemplified by the architectural overview in FIG. 1. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory ("ROM") 124 and a random access memory ("RAM") 125. A basic input/output system ("BIOS") 126, containing the basic routines that help to transfer information between elements within the personal computer 120, such as during startup, is stored in ROM 124.

The personal computer 120 further includes a hard disk drive 127 for reading from and writing to a hard disk (not shown) a magnetic disk drive 128 for reading from or writing to a removable magnetic disk 129, and an optical disk drive 130 for reading from or writing to a removable optical disk 131 such as a compact disk read-only memory ("CD-ROM") or other optical media. The hard disk drive 127, magnetic disk drive 128, and optical disk drive 130 are each connected to the system bus 123 by a hard disk drive interface 132, a magnetic disk drive interface 133, and an optical disk drive interface 134, respectively.

Although the exemplary environment described herein employs a hard disk 127, a removable magnetic disk 129, and a removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for the personal computer 120.

A number of program modules may be stored on the hard disk 127, magnetic disk 129, optical disk 131, ROM 124, or RAM 125, including an operating system 135 and a drawing processing module 175. Program modules include routines, sub-routines, programs, objects, components, data structures, etc., which perform particular tasks or implement particular abstract data types. Aspects of the present invention may be implemented in the form of a drawing processing module 175.

A user may enter commands and information into the personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus ("USB"), or the like. A display device 147 may also be connected to the system bus 123 via an interface, such as a video adapter 148. In addition to the monitor, personal computers typically include other peripheral output devices (not shown), such as speakers and printers.

The pointing device 142 can control a pointer, such as a cursor on a displayed, or electronic, page. Moving a mouse or a trackball, for example, can adjust the position of the pointer on the displayed page. The pointing device 142 can also include a button or similar feature through which a user can communicate with software routines executing in the computer system 120. For example, a user of a drawing software package can position the pointer over an object on an electronic page and depress the button to select the object. This action is referred to as "clicking" on the object. With the object selected and the pointing device in the clicked state, the user can reposition the object on the page and release the click to set the object into its new position on the page.

The personal computer 120 may operate in a networked environment using logical connections to one or more remote computers 149. A remote computer 149 may be another personal computer, a server, a client, a router, a network personal computer, a peer device, or other common network node. While a remote computer 149 typically includes many or all of the elements described above relative to the personal computer 120, only its memory storage device 150 has been illustrated in FIG. 1. The logical connections depicted in FIG. 1 include a local area network ("LAN") 151 and a wide area network ("WAN") 152. Such networking environments are commonplace in offices, enterprise-wide computer networks, intranets, and the Internet.

When used in a LAN networking environment, the personal computer 120 is often connected to the LAN 151 through a network interface or adapter 153. When used in a WAN networking environment, the personal computer 120 typically includes a modem 154 or other apparatus for establishing communications over a WAN 152, such as the Internet. The modem 154, which may be internal or external, is connected to a system bus 123 via serial port interface 146. In a networked environment, program modules depicted relative to a personal computer 120, or portions thereof, may be stored in the remote memory storage device 150. It will be appreciated that the network connections shown are exemplary and other provisions for establishing a communications link between the computers may be used.

Moreover, those skilled in the art will appreciate that the present invention may be implemented in other computer system configurations, including handheld devices, multiprocessor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
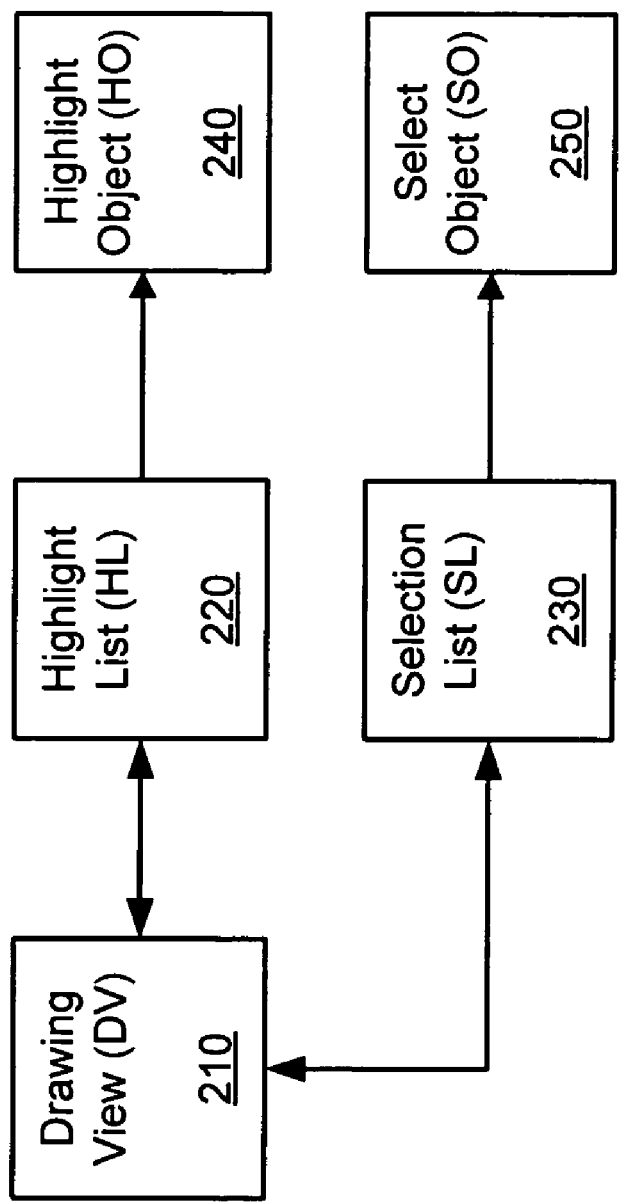
FIG. 2 is a functional block diagram illustrating an exemplary software environment for implementing various embodiments of the present invention.

FIG. 2 is a functional block diagram depicting an exemplary software environment for implementing various embodiments of the present invention and more specifically illustrating select exemplary software components of the drawing processing module 175 illustrated in FIG. 1. The exemplary functional blocks 210-250 depicted in FIG. 2 represent the software modules that perform steps related to invoking toolsets in one exemplary embodiment of the present invention.

Drawing view ("DV") 210 is a software module and dynamic data file that functions like an electronic sheet for graphic and textual objects. While a user is actively working with a drawing, each of the objects in the drawing is stored in and by DV 210. When a user executes an operation, such as a resize, on an object, a software routine, which typically includes code internal to DV 210, renders the object into DV 210. DV 210 also includes a coordinate system, which can be displayed as a grid on the computer monitor 147, for tracking the position of each object on the drawing sheet. DV 210 also tracks pointer position and movement on the basis of this coordinate system. For example, DV 210 can determine if a pointer is positioned over an object or a tool. An internal timer times the length of time that the cursor is stationary at a location on the display 147.

DV 210 also includes routines that invoke handle-based toolsets and perform manipulations on objects in response to user input via these toolsets. For example, if a user invokes a tool and engages the tool to manipulate an object, DV 210 uses its routines to execute the manipulation.

The drawing processing module 175 also includes a selection list ("SL") 230, which is a software module coupled to DV 210 that maintains a list of all selected objects. A user can select an object in preparation to performing an operation, such as a deleting or a rotating operation, on the object. SL 230 maintains a dynamic data file of the objects so selected. When a user selects an object for deletion, for example, SL 230 adds the object to its dynamic file of selected objects. DV 210 repaints the drawing sheet when the selected object 310 is deleted so that object is no longer visible on the display screen 147. For each object in a drawing, the drawing processing module 175 maintains a corresponding select object ("SO") 250.

SL 230 also supports working with objects between software applications and outside of a specific graphic software environment. For example, a presentation software application can import an object from a drawing packaging by enlisting the SL 230 of the drawing package to export the object.

Highlight list ("HL") 220 is a software module of the drawing processing module 175 that manages the processes associated with highlighting objects. Highlighting an object can entail displaying a visible selection box around the object or tracing the outline of the object in a bright highlight color. HL 220 is distinct from SL 230 to support situations in which an object is selected but not highlighted, such as when an object is transferred between two software applications.

When a user or another software routine executes a command to perform an operation on an object, the command goes through SL 230 for issue against the selection. If appropriate, HL 220 highlights the object on the display screen 147 to indicate preparedness for executing the command or the state of command execution. Although DV 210 maintains exactly one HL 220, the drawing processing module 175 maintains a corresponding highlight object ("HO") 240 for each object on the display.

Processes and components of an exemplary embodiment of the present invention will now be described in reference to FIGS. 3-16. The present invention includes multiple computer programs which embody the functions described herein and illustrated in the exemplary displays, the timing diagrams, and the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary displays, timing diagrams, and flow charts and associated description in the application text, for example.

Therefore, disclosure of a particular set of program code instructions is not considered necessary for an adequate understanding of how to make and use the invention. The inventive functionality of the claimed computer program will be explained in more detail in the following description in conjunction with the remaining Figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Exemplary Process for Invoking Handle-Based Toolsets

Figure 3:
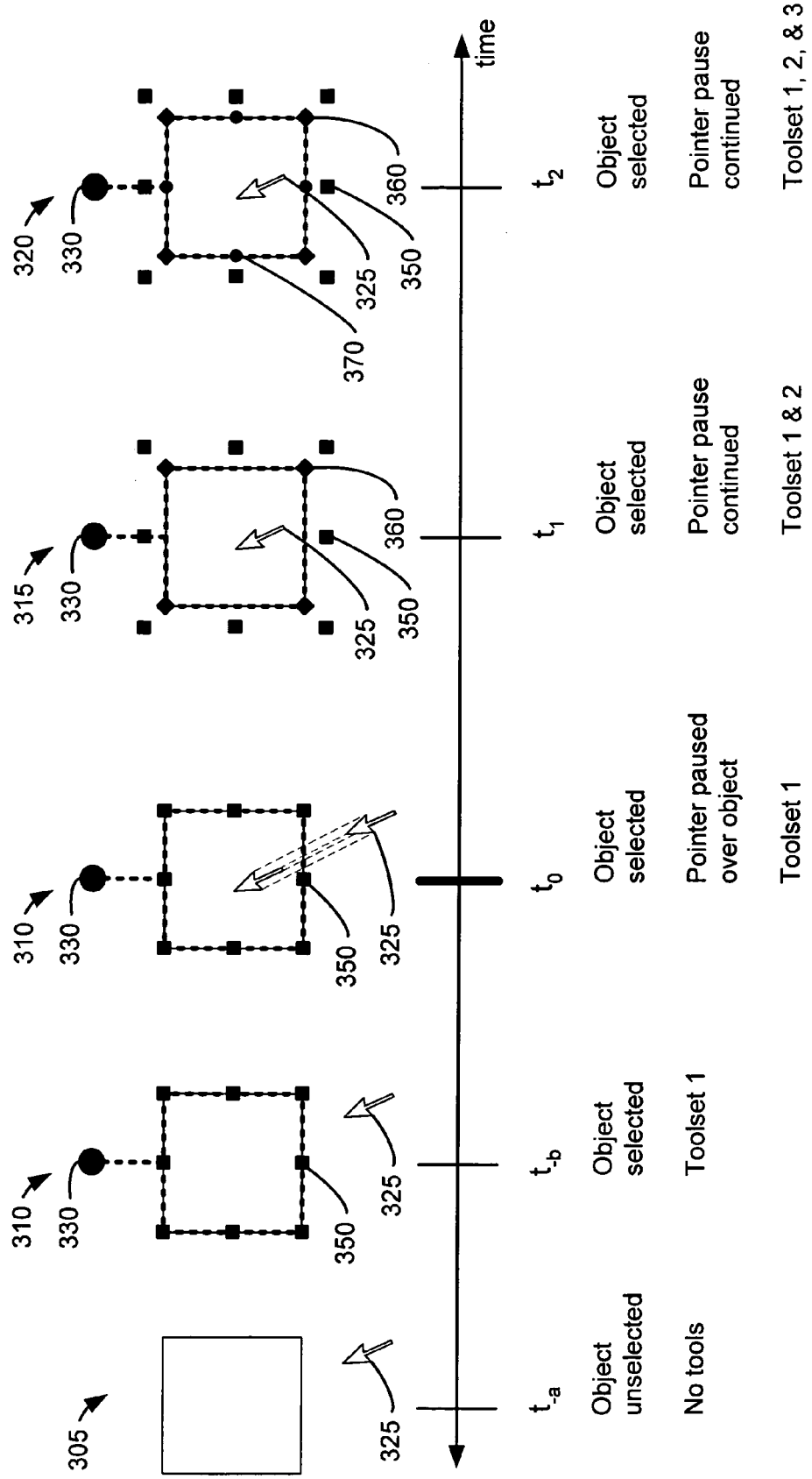
FIG. 3 is a timing diagram illustrating the evolution of handle-based toolsets with increasing functionality according to one exemplary embodiment of the present invention.

FIG. 3 depicts a timing diagram 300 illustrating the evolution of handle-based toolsets with functionality that increases over time according to one exemplary embodiment of the present invention. The functionality of the tools that are available to the user for operating on a graphic object 305 evolves in response to pointer input and the passage of time.

At time $t_{-a}$, the electronic page includes an unselected graphic object 305, which is a square shape. At some earlier time, a user could have created the object 305 on the page using the pointer 325, imported from it from another application, or copied it from an electronic stencil. In its unselected state 305, the graphic object 305 does not exhibit handle-based tools through which a user can manipulate the object 305.

At time $t_{-b}$, a user selects the object 305 by positioning the pointer 325 over the object 305 and clicking, encircling the object 305 with a selection box, or pressing a soft key, for example. As indicated in FIG. 3, the pointer 325 is not necessarily positioned over the object 305 in the object-selected state. Selecting the object 305 invokes the initial handle-based toolset 310. The initial toolset 310, Toolset One, includes eight shape-level handles 350 and a rotation tool 330. A user can engage one of the eight handles 350 with a pointer 325 to reshape the object 305. The four corner handles are operative to expand or contract the square 305 uniformly, while the other four handles are operative to stretch or compress the square 305 into a rectangle with sides of unequal length. The user can also engage the rotation tool 330 to rotate the object 305.

At time $t_0$, a user pauses the pointer 325 over the object 305. When the pointer 325 pauses over the object 305, a timer in DV 210 initiates timing the length of time that the pointer 325 is stationary in that position. If the pointer 325 dithers or otherwise moves, the timer resets.

As used herein in reference to the present invention, the region of a drawing, page, electronic page, or display that is "over an object," "over a graphic," "over a handle", "over a tool," etcetera includes not only the object 305 itself but also any responsive region that is adjacent to the object 305, such as a selection region or a gravity region. For example, in one embodiment of the present invention, if the pointer 325 and the object 305 are positioned on a display within a specified number of pixels of one another, then the pointer 325 qualifies as being "over" the object 305.

At time $t_1$, the pointer 325 remains stationary in the position established at $t_0$.

At this time on the timing diagram 300, the timer has accumulated a $t_1$ length of time since the time $t_0$. This passage of time automatically invokes a second handle-based toolset 315 to augment the functionality of the first toolset 310. The second toolset 315 includes four vertex handles 360, one for each of the four vertices of the rectangle. If the object 305 was a triangle or an octagon, for example, the toolset 315 would include three or eight vertex handles 360 respectively.

To make room on the display for the vertex handles 360, DV 210 displaces the shape-level handles 350 slightly away from their original position. A user can engage the vertex handles 360 to modify the geometry of the object 305, for example skewing the square 305 into a parallelogram with two acute and two obtuse angles.

At time $t_2$, the pointer 325 continues to remain stationary in the position established at $t_0$. At this time on the timing diagram 300, the timer has accumulated a $t_2$ length of time since the position of the pointer 325 became stationary over the object 305 at time $t_0$. This passage of time automatically invokes a third handle-based toolset 320 to augment the functionality of the first and second toolsets 310, 315. The third toolset 320 includes four sub-shape handles 370, one for each line of the square, each of which is operable to reform a line into an arc. If the object 305 was a triangle or an octagon, for example, the third toolset 320 would include three or eight sub-shape handles 370 respectively.

Once a toolset is invoked for a specific object 305, that toolset is available as long as the user continues working with that object 305. In other words, an object's toolset handles are not revoked until a user deselects the object 305, and deselecting an object revokes all handle-based tools for the object 305.

If Toolset Three 320 is invoked, the object 305 retains that state indefinitely. If Toolset One 310 or Toolset Two 315 is invoked, the object 305 remains in that state until the pointer 325 pauses over the object 305 and remains stationary for a threshold length of time. If a user moves the pointer 325 off of the object 305, the timer suspends timing. When the user returns the pointer 325 to a stationary position over the object 305, the timer resets and initiates timing towards the threshold time. Based on the exemplary sequence of invoking tools presented in FIG. 3, a new or casual user of a software program can manipulate objects based on intuition rather than extensive training. Subsequent figures illustrate the time aspects of invoking tools in further detail.

Figure 4:
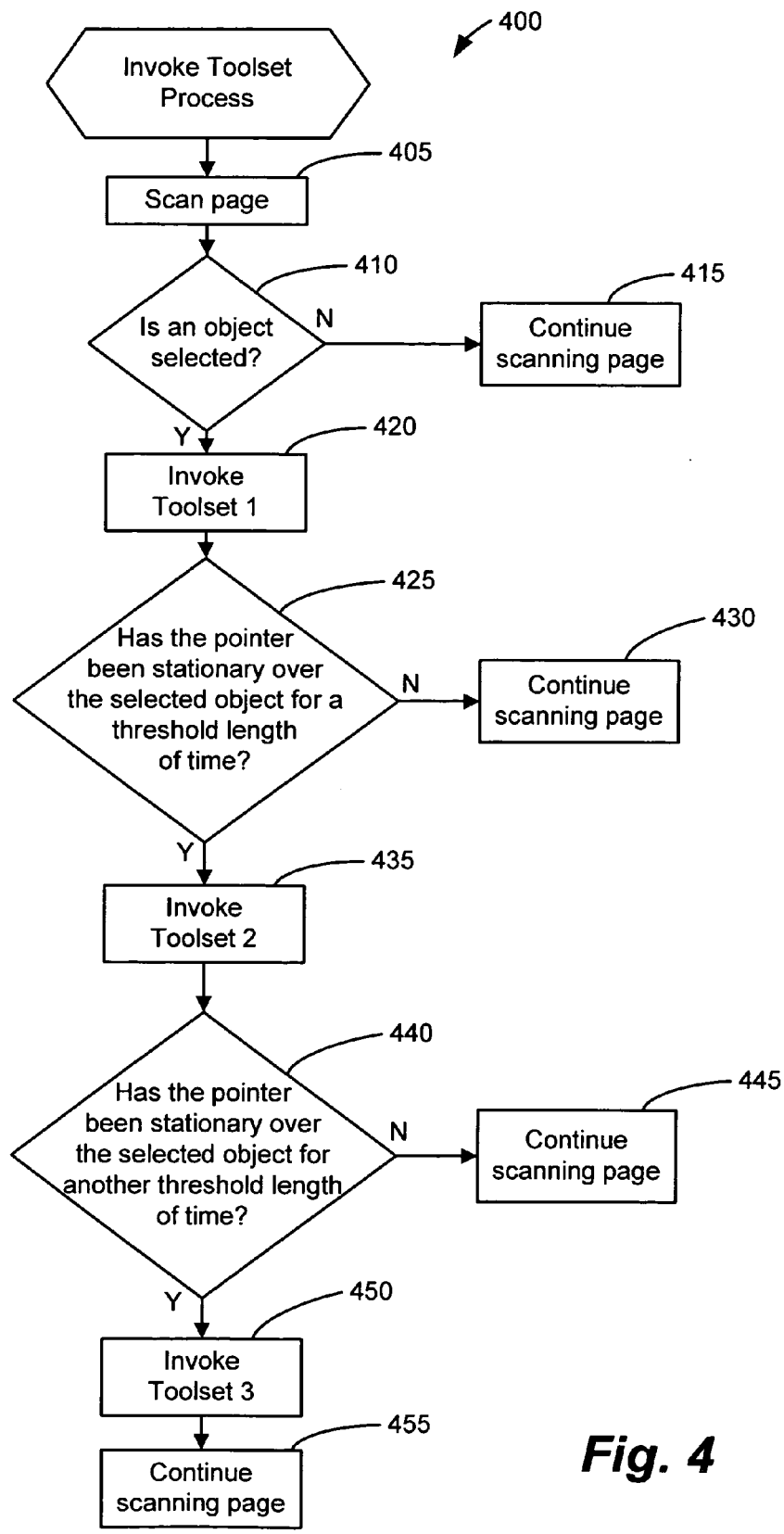
FIG. 4 is a flow chart illustrating an overview of an exemplary process for invoking toolsets, such as the toolsets exemplified in FIG. 3, according to one exemplary embodiment of the present invention.

FIG. 4 is a flow chart, which generally corresponds to the timing diagram 300 of FIG. 3, illustrating an overview of an exemplary process 400 for invoking toolsets. FIGS. 9A-B, which are described below, illustrate an exemplary routine that generally corresponds to this flow diagram and provides additional detail regarding processes for invoking toolsets.

Turning now to FIG. 4, at Step 405 in Invoke Toolset Process 400, DV 210 scans the page to identify the position of the pointer 325 and the position and selection state of any objects 305 that are on the page. At inquiry Step 410, DV 210 determines if an object is selected. If no object is selected, DV 210 continues scanning the page at Step 415. If an object is selected, DV 210 invokes a toolset at Step 420. The invoked toolset can be Toolset One 310 at time t-b as depicted in the timing diagram 300 that is illustrated in FIG. 3.

After invoking Toolset One 310, DV 210 determines at inquiry Step 425 if the pointer 325 has been stationary over the selected object 310 for a specified length of time, such as a threshold length of time. DV 210 maintains a timer that clocks the time during which the pointer 325 is stationary. In one exemplary embodiment of the present invention, the threshold length of time is less than two seconds. In one exemplary embodiment of the present invention, the threshold length of time is less than one second. In one exemplary embodiment of the present invention, the threshold length of time is approximately three fourths of a second. If the pointer 325 has not been stationary over the object 305 for at least the threshold length of time, then at Step 430, DV 210 continues scanning the page. As DV 210 scans the page, it continues to determine if the object 305 meets the conditions of inquiry Step 425. Also, if the object's state changes from selected 310 to unselected 305, then Process 400 resumes scanning the page to determine if another object is selected and therefore meets the conditions of Step 410.

If the pointer 325 has been stationary over the object 305 for at least the threshold length of time, then at Step 435, DV 210 invokes another toolset to supplement the functionality of the first toolset 310. The new toolset can be Toolset Two 315 at time $t_1$ as depicted in the timing diagram 300 that is illustrated in FIG. 3. To make room on the page for the two sets of handles, the handles 350 associated with Toolset One 310 can be moved slightly away from the object 305.

After invoking Toolset Two 315, DV 210 references its internal clock and determines at inquiry Step 440 if the pointer 325 has been stationary over the selected object 310 for another threshold length of time. In one exemplary embodiment of the present invention, this threshold length of time is the same as the threshold length of time associated with invoking Toolset Two 315. In one exemplary embodiment of the present invention, this threshold length of time is approximately three fourths of a second. Moving the pointer 325 stops and resets the timer; DV 210 restarts the timer when the pointer 325 comes back to rest over the object 305. Although moving the pointer 325 does not revoke Toolset One 310 or Toolset Two 315, deselecting the object 305 revokes all toolsets. If the pointer 325 has not been stationary over the object 305 for at least the threshold length of time, DV 210 continues scanning the page at Step 445.

If at Step 440 DV 210 determines that the pointer 325 has been stationary over the object 305 for another threshold length of time, then DV 210 invokes Toolset Three 320 at Step 450 and continues scanning the page at Step 455.

In one embodiment of the present invention the functionality of the toolset that is initially available to a user upon selecting an object 305 depends upon a menu selection, such as the state of the pointer-selectable buttons on a toolbar. Suppose, for example, that a user has been bending and shaping lines using tools accessed through the toolbar. As a result of these activities, the buttons on the toolbar related to bending and shaping lines are depressed. If the user selects a new object for editing, the user likely intends to bend and shape the lines of that object as well. When the user selects the object, the present invention can invoke the tool handles that are consistent with the user's anticipated intent. In other words, selecting the object can invoke the sub-shape level handles 370 that are operative to bend the lines in the object.

In one embodiment of the present invention, toolsets are invoked according to a predefined and ordered sequence, such as Toolset One 310 first, Toolset Two 315 second, and Toolset Three 320 third. Invoking a new toolset in the sequence does not revoke the existing toolsets. Rather, the toolset evolution adds new tools to the existing tools that are available to the user. Furthermore, once a toolset is invoked, the user cannot revoke only that toolset. In other words, the user cannot reverse the sequence or revoke one specific toolset. However, the user can restart the toolset evolution sequence by deselecting and reselecting the object.

In one embodiment of the present invention, a drawing software package includes a set of predefined objects such as icons, graphic representations of common products, flowchart elements, and geometric shapes. A user can insert a copy of these predefined objects into a page and manipulate the copied object with tools such as the handles 330, 350, 360, 370 of Toolsets One, Two, and Three 310, 315, 320. The user can also use tools to create user-defined objects from scratch. In one embodiment of the present invention, a process such as Process 400 automatically invokes handle-based tools for the user-defined objects but not for predefined objects.

Process 400 helps a new or casual user of a drawing software package learn the features and functions of the tools that are available to manipulate an object 305. A user can become proficient with a software package's features and tools without extensive training or experience. The user can perform multiple operations on an object 305 based on intuition and without moving the pointer 325 away from the vicinity of the object 305.

Whereas the FIG. 4 flow chart describes an overview of an exemplary process for invoking toolsets generally corresponding to the timing diagram 300 depicted in FIG. 3, FIG. 5 presents steps associated with the timing diagram 300. That is, FIG. 5 illustrates an exemplary timed sequence of computer-implemented steps which generally follow the timing diagram 300 of FIG. 3.

The steps and timing of FIG. 5 will now be described. At time $t_{-a}$, an unselected object 305 is present on the page. At this time, a user might call the page from a stored file, for example. At Step 502, which occurs at time $t_{-a}$ in the timing diagram 300, DV 210 draws the object 305 on the displayed page in response to input from a user.

At time $t_{-b}$ in the timing diagram 300, a user selects the object 310 and consequently invokes Toolset One 310 and initiates Steps 505-525. At Step 505, DV 210 redraws the object 305. At Step 515, HL 220 lists the object 305 in its list of highlighted objects. At Step 520, SL 230 lists the object 305 in its list of selected objects. At Step 522, DV 210 repaints HL 220. At Step 525, HL 220 repaints HO 240.

At time to in the timing diagram 300, a user pauses the pointer 325 over the selected object 305 and consequently initiates Steps 535-542. At Step 535, DV 210 detects pointer movement, such as when a user moves the cursor over the object 305 using a mouse. At Step 540, DV 210 detects that the pointer 325 is stationary over the object 305. At Step 542, DV 210 begins timing the length of time that the pointer 325 remains stationary over the object 305.

At time $t_1$ in the timing diagram 300, the user has continued to pause the pointer 325 over the object 305 for a threshold length of time, thereby invoking Toolset Two 315 and initiating Steps 545-570. At Step 545, the timer, which is a component of DV 210, notifies DV 210 that $t_1$ time has accumulated with the pointer 325 remaining in a single stationary position over the object 305. This amount of time constitutes the threshold that triggers DV 210 to invoke Toolset Two 315. At Step 550, HL 220 updates HO 240 to identify that the object 305 is in its highlighted state. At Step 555, HO 240 notifies DV 210 to repaint the object 305. At Step 560, DV 210 responds to the notification and repaints the object 305 so that the displayed page is free from extraneous marks. At Step 565, HL 220 repaints HO 240. At Step 570 DV 210 resets and restarts the timer when the pointer 325 is stationary over the object 305. Alternatively, DV 210 can record the time on the timer so that subsequently accumulated time is referenced back to this point. In other words, the timer can continue to accumulate time using the recorded time as a reference point.

At time $t_2$ in the timing diagram 300, the user has paused the pointer 325 over the object 305 for another threshold length of time, thereby invoking Toolset Three 320 and initiating Steps 575-590. At Step 575, the timer notifies DV 210 that $t_2$ has accumulated while the pointer 325 remains in a stationary position over the object 305. This accumulation of time constitutes the threshold that triggers the invocation of Toolset Three 320.

In one embodiment, DV 210 resets the timer to zero upon invoking Toolset Two 315 and restarts the timer when the pointer 325 is stationary over the object 305. In this embodiment, the threshold can be described in terms of a quantity of time equal to $t_2$ minus $t_1$ as depicted on the timing diagram 300. In an alternative but functionally similar embodiment, DV 210 continues clocking time after invoking Toolset Two 315 and the pointer 325 is stationary over the object 305. If the user moves the pointer 325 then brings it back to rest over the object 305, DV 210 resets the timer to $t_1$. In this embodiment, the time threshold for invoking Toolset Three 320 can be described in terms of a quantity of time equal to $t_2$ as depicted on the timing diagram 300.

At Step 580, HL 220 updates HO 240 to indicate that the object 305 is presented on the displayed page as a highlighted object 305. At Step 583, HO 240 notifies DV 210 to repaint the object 305. At Step 586, DV 210 repaints HL 220. At Step 590, HL 220 repaints HO 240.

Figure 7:
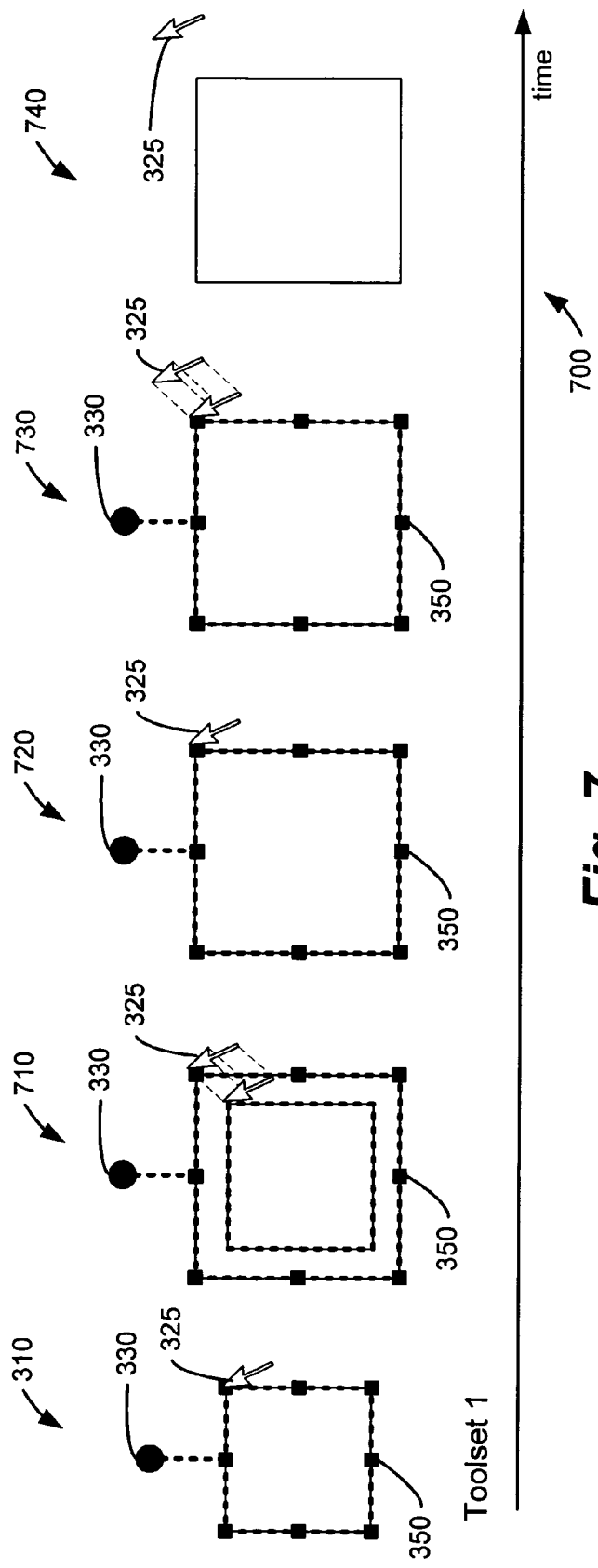
FIG. 7 illustrates exemplary functionality of the handles of a toolset corresponding to exemplary Toolset One invoked in the timing diagram illustrated in FIG. 3, according to one exemplary embodiment of the present invention.
Figure 8:
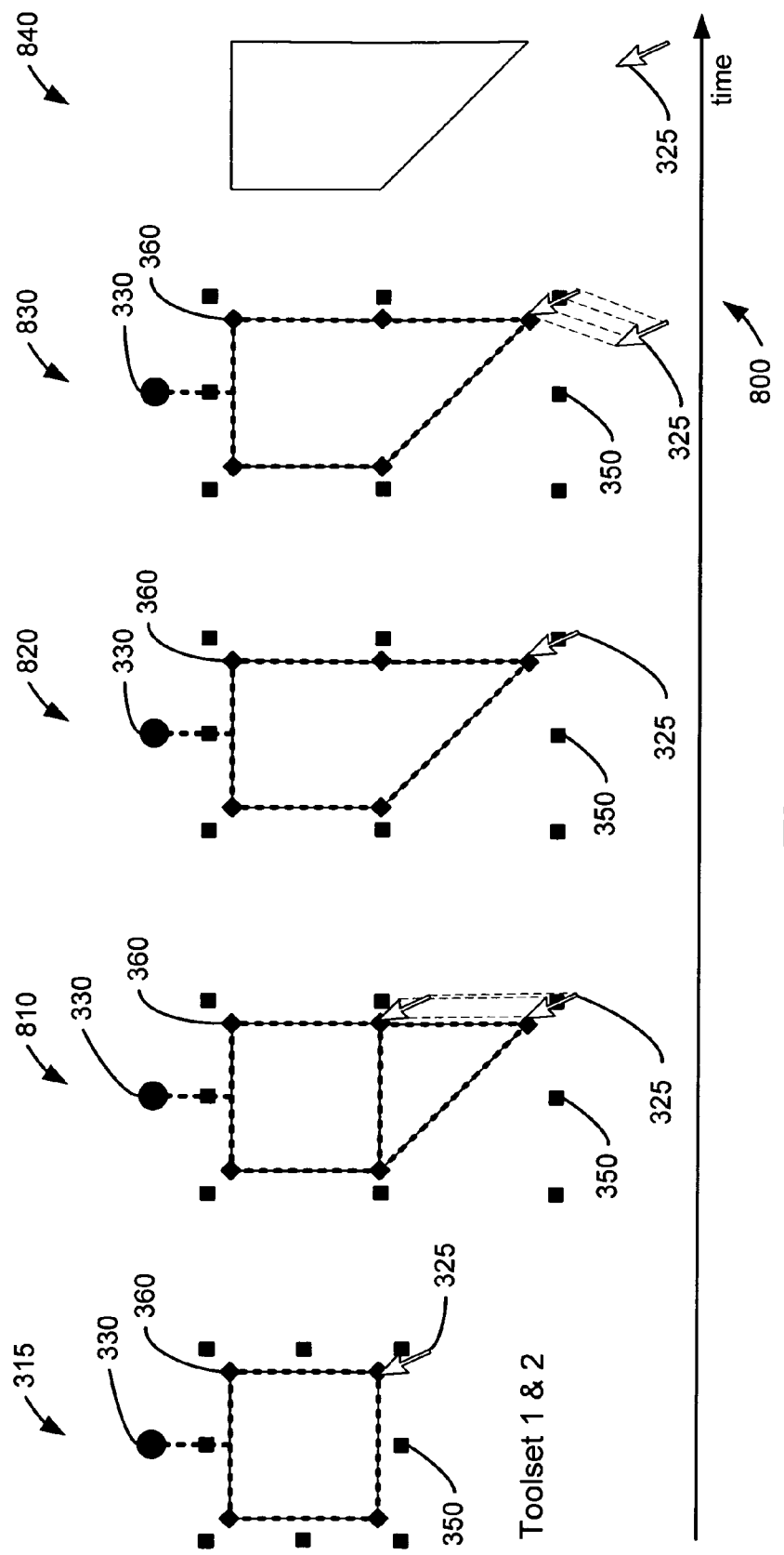
FIG. 8 illustrates exemplary functionality of the handles of a toolset corresponding to exemplary Toolset Two invoked in the timing diagram illustrated in FIG. 3, according to one exemplary embodiment of the present invention.
Figure 9:
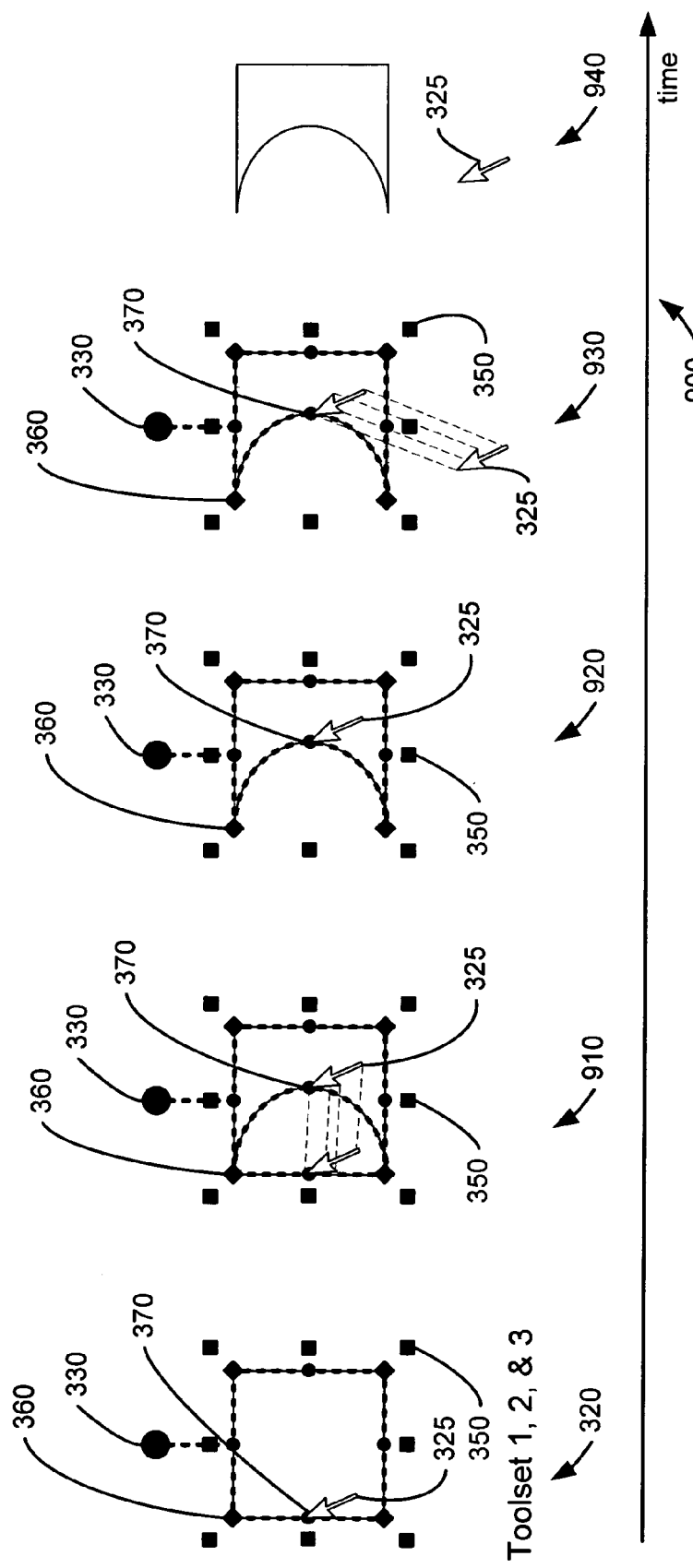
FIG. 9 illustrates exemplary functionality of the handles of a toolset corresponding to exemplary Toolset Three invoked in the timing diagram illustrated in FIG. 3, according to one exemplary embodiment of the present invention.

If the user deselects (not illustrated) the object 305, the state of the object 305 moves back to time $t_{-a}$ on the timing diagram 300. If the object 305 remains selected from time $t_2$ forward, then all three toolsets 310, 315, 320 are available to the user for performing operations on the object 305. FIGS. 7-9, which are described below, illustrate exemplary functionality of the handle-based toolsets 310, 315, 320.

Figure 6A:
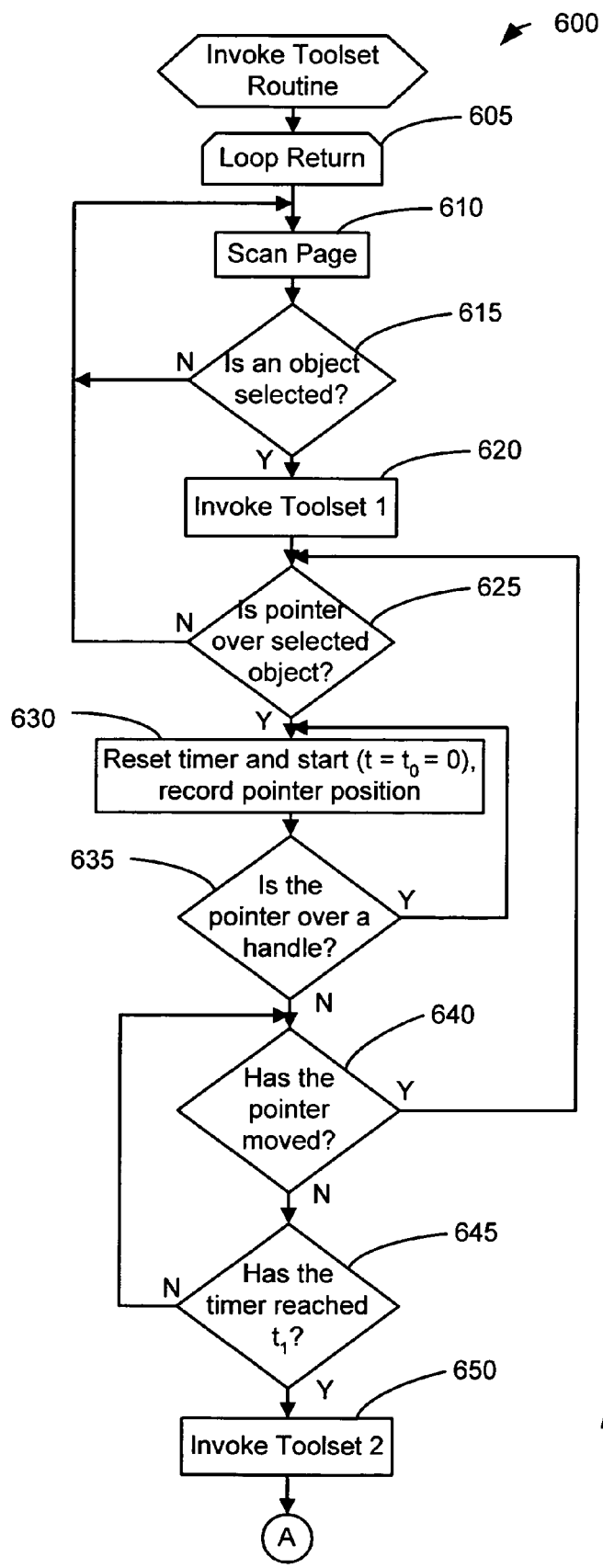
FIGS. 6A-B illustrate a flowchart of an exemplary routine for invoking toolsets, generally corresponding to the process illustrated in FIG. 4, according to one exemplary embodiment of the present invention.
Figure 6B:
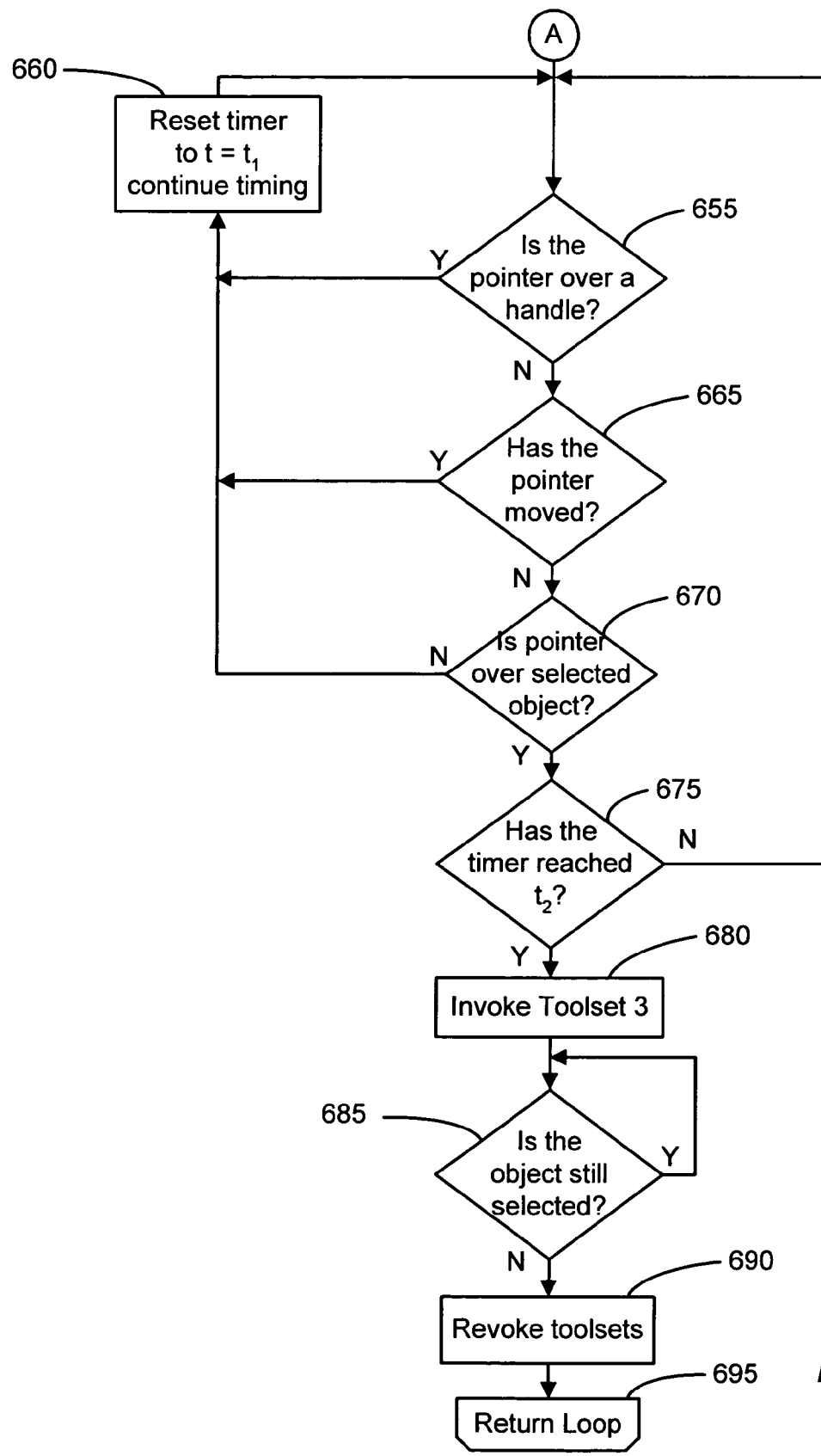

FIGS. 6A-B illustrate a flowchart of an exemplary routine 600, titled Invoke Toolset Routine, for invoking toolsets that generally corresponds to the processes for invoking handle-based toolsets illustrated in FIGS. 3-5. The initial portion of the flow chart includes a loop return point 605 so that subsequent steps can direct the flow of the routine back to this point.

At Step 610 on FIG. 6A, DV 210 scans the displayed page to determine the state and locations of the objects 305 on the page and the location of the pointer 325. At inquiry Step 615, DV 210 determines if an object 305 is selected. To make this determination, DV 210 accesses the selection list that SL 230 maintains. If no object is selected, DV 210 continues scanning the page at Step 610. If an object is selected, then DV 210 invokes Toolset One 310 as illustrated at time $t_{-b}$ on the timing diagram 300 depicted in FIGS. 3 and 5.

At inquiry Step 625, DV 210 determines if the pointer 325 is over the selected object 310. If the pointer 325 is not over the selected object 310, then DV 210 continues scanning the page at Step 610. If the pointer 325 is over the selected object 310, then at Step 630 DV 210 sets the timer to "time equals zero" and initiates timing. Also at Step 630, DV 210 records the pixel position of the pointer 325.

At inquiry Step 635 following Step 625, DV 210 determines if the pointer 325 is over one of the handles 330, 350 of Toolset One 310. The pointer 325 over a handle 330, 350 indicates that that the user may be preparing to use the handle 330, 350 to manipulate the object 305. In this scenario, the user does not need another toolset; therefore, DV 210 maintains the timer at time zero by iterating Step 630 until the user moves the pointer 325 away from the handle 330, 350.

At inquiry Step 640, DV 210 determines if the pointer 325 has moved since Step 625. To make this determination, DV 210 compares the current position of the pointer 325 to the position recorded at Step 625. If the pointer position has moved, then DV 210 iterates Steps 625, 630, and 635 until the pointer 325 is either no longer over the selected object 310 or the pointer 325 is stationary over the selected object 310.

If at Step 640 the pointer 325 has not moved, then at inquiry Step 645 DV 210 determines if the time has reached the $t_1$ time threshold for invoking Toolset Two 315. If the timer has not reached the threshold, then DV 210 iterates inquiry Step 640 until the pointer 325 moves or the timer reaches the time threshold. When the timer reaches the time threshold, then, at Step 650, DV 210 invokes Toolset Two 315 as illustrated at $t_1$ in the timing diagram 300 illustrated in FIGS. 3 and 5. After invoking Toolset Two 315, the user has handle-based access to Toolset One 310 and Toolset Two 315.

In the embodiment of the present invention illustrated by Routine 600 of FIGS. 6A-B, invoking Toolset Two 315 does not, in and of itself, reset the timer. In other words, the timer continues to accumulate time past $t_1$ in the subsequent steps of Routine 600.

In one embodiment of the present invention, contemporaneous with invoking Toolset Two 315, DV 210 adjusts the positions of the handles 350 of Toolset One 310 to provide additional space for pointer 325 access to the handles 350, 360 of both toolsets 310, 315.

The flow chart for Routine 600 continues on FIG. 6B from Step 655 forward. At inquiry Step 655, DV 210 records the current position of the pointer 325 and determines if it is over a handle 330, 350, 360 of Toolset One 310 or Toolset Two 315. Since this pointer position indicates that the user is preparing to use or is in the process of using a handle 330, 350, 360, DV 210 resets the timer to $t_1$ at Step 660 and iterates inquiry Step 655 until the pointer 325 is no longer over a handle 330, 350, 360. At inquiry Step 665, DV 210 determines if the pointer 325 has moved since its last recorded position. If the pointer 325 has moved, Routine 600 loops back to Step 660 and resets the timer to $t_1$. If the pointer 325 has not moved, then at inquiry Step 670, DV 210 determines if the pointer 325 is over the selected object 310. If the pointer 325 is not over the selected object 310, Routine 600 loops back to Step 660 and resets the timer to $t_1$.

Routine 600 continues to reset the timer to $t_1$ and iterate inquiry Step 655, Step 665, and Step 670 until all the criteria of these three inquiry steps are met. In other words, when the pointer 325: is not over a handle 330, 350, 360; is stationary; and is over a selected object 310, DV 210 allows the timer to accumulate time past $t_1$. At that point, the flow of Routine 600 proceeds past Step 670 to Step 675.

At inquiry Step 675, DV 210 determines if the timer has reached $t_2$, the threshold for invoking Toolset Three 320, as illustrated in the timing diagram 300 of FIGS. 3 and 5. If the timer has not reached this threshold, then Routine 600 iterates Step 655, Step 665, and Step 670 until the timer accumulates the threshold level of time.

When the timer accumulates sufficient time, DV 210 invokes Toolset Three 320 at Step 680, as illustrated in the timing diagram 300 of FIGS. 3 and 5. The handles 330, 350, 360 of Toolset One 310 and Toolset Two 315 remain available to the user.

At Step 685, DV 210 determines if the object 305 is still selected. To make this determination, DV 210 scans the displayed page for selected objects 310. More specifically, DV 210 accesses the list of selected objects that SL 230 maintains. If the object's state changes to unselected, then at Step 690, DV 210 revokes all toolsets. At Step 695, Routine 600 loops back to the loop return point 605 and initiates scanning the page for selected objects 310.

Although not depicted throughout the flowchart 600 for Routine 600, in one embodiment of the present invention, Routine 600 includes for each illustrated step checking the selection state of the object 305. If the state of the object 305 changes from selected to unselected, then Routine 600 terminates processing that object 305 and resumes scanning the page for newly selected objects.

Exemplary Functionality of Handle-Based Toolsets

FIGS. 7-9 illustrate exemplary functionality for the handle-based toolsets described in FIGS. 3-6 and the above text. More specifically FIGS. 7, 8, and 9 illustrate exemplary functionality for Toolset One, Two, and Three 310, 315, 320 respectively.

FIG. 7 illustrates an exemplary sequence 700 of a user manipulating an object 305 using a pointer 325 in conjunction with the handles 330, 350 of Toolset One 310. The sequence begins with the object 305 in a selected state 310 and ends with the object 305 enlarged and in an unselected state.

At Step 310 in the sequence, the object is selected, and Toolset One 310 is invoked. The user has placed the pointer 325 over one of the shape handles 350 in preparation for manipulating the object 305. As described above, DV 210 does not invoke Toolset Two 315 when the pointer 325 is in this position since the timer does not accumulate time.

At Step 710, the user symmetrically enlarges the object 305 by clicking the pointer 325 onto a handle 350 in the corner of the object 305 and moving the pointer 325 diagonally outward. The user may move a mouse to control the position of a cursor and use a switch or button on the mouse to actuate the click.

At Step 720, the user releases the click so that the handle 350 does not respond to subsequent pointer motion by resizing the object 305. At Step 730, the user moves the pointer 325 off of the handle 350 and away from the object 305. At Step 720, the user deselects the resized object by clicking and releasing the pointer 325 while the pointer 325 is positioned away from the object 305. Following this pointer gesture, the enlarged object is not selected and does not have any associated handle-based tools.

FIG. 8 illustrates an exemplary sequence 800 of a user manipulating an object 305 using a pointer 325 in conjunction with the handles 360 of Toolset Two 315. The sequence begins at Step 315 with the object 305 in a selected state with Toolset One 310 and Toolset Two 315 invoked. At the end of the sequence, the object 305 is transformed into a new geometric shape.

At Step 315, the pointer 325 is positioned over one of the four vertex handles 325 of Toolset Two 315. At Step 810, the user clicks on the vertex handle 325 and moves the pointer 325 down the page. This pointer gesture moves the vertex of the object 305 to the new pointer position and thereby alters the object's shape. At Step 820, the user releases the click to set the shape of the object according to the position of the pointer 325 immediately prior to the click release. This action also frees the user to reposition the pointer 325 without altering the object's geometry. At Step 830, the user moves the pointer 325 away from the object 305. At Step 840, the user deselects the transformed object by clicking the pointer 325 on an empty region of the page.

FIG. 9 illustrates an exemplary sequence 900 of a user manipulating an object 305 using a pointer 325 in conjunction with the handles 370 of Toolset Three 320. The sequence begins at Step 320 with the object 305 in a selected state and with Toolset One 310, Toolset Two 315, and Toolset Three 320 invoked. At the end of the sequence, the object 305 is transformed in a geometric shape with a concave edge.

At Step 320, the pointer 325 is positioned over one of the four sub-shape level handles 370 of Toolset Three 320 that are operative to arc a line, such as the edge of an object 305. At Step 910, the user clicks on one of the handles 370 of Toolset Three 320 and moves the pointer 325 horizontally towards the center of the object 305. This pointer gesture stretches the edge of the object 305 into a concave arc. At Step 920, the user releases the pointer click. At Step 930, the user moves the pointer 325 away from the newly shaped object. At Step 940, the user deselects the object.

FIGS. 7-9 illustrate functionality and user interface of the handles 350, 360, 370 of Toolsets One, Two, and Three 310, 315, 320 that manipulate the size and geometric aspects of an object 305. The toolsets can also include handles that provide a user with the capability to alter the presentation or position of the object on a page. For example, a rotation tool handle 330, which is one of the tools in Toolset One 310, provides a user with the capability to rotate an object 305 with a pointer 325.

Exemplary Process for Invoking Handle-Based Tools for Rotating an Object

As illustrated in FIG. 3, Toolset One 310 includes a handle-based rotation tool handle 330 that is available to the user throughout the evolution of toolsets 310, 315, 320. A user can rotate an object 305 about an axis of rotation by interfacing the pointer 325 to the rotation tool handle 330.

Figure 10:
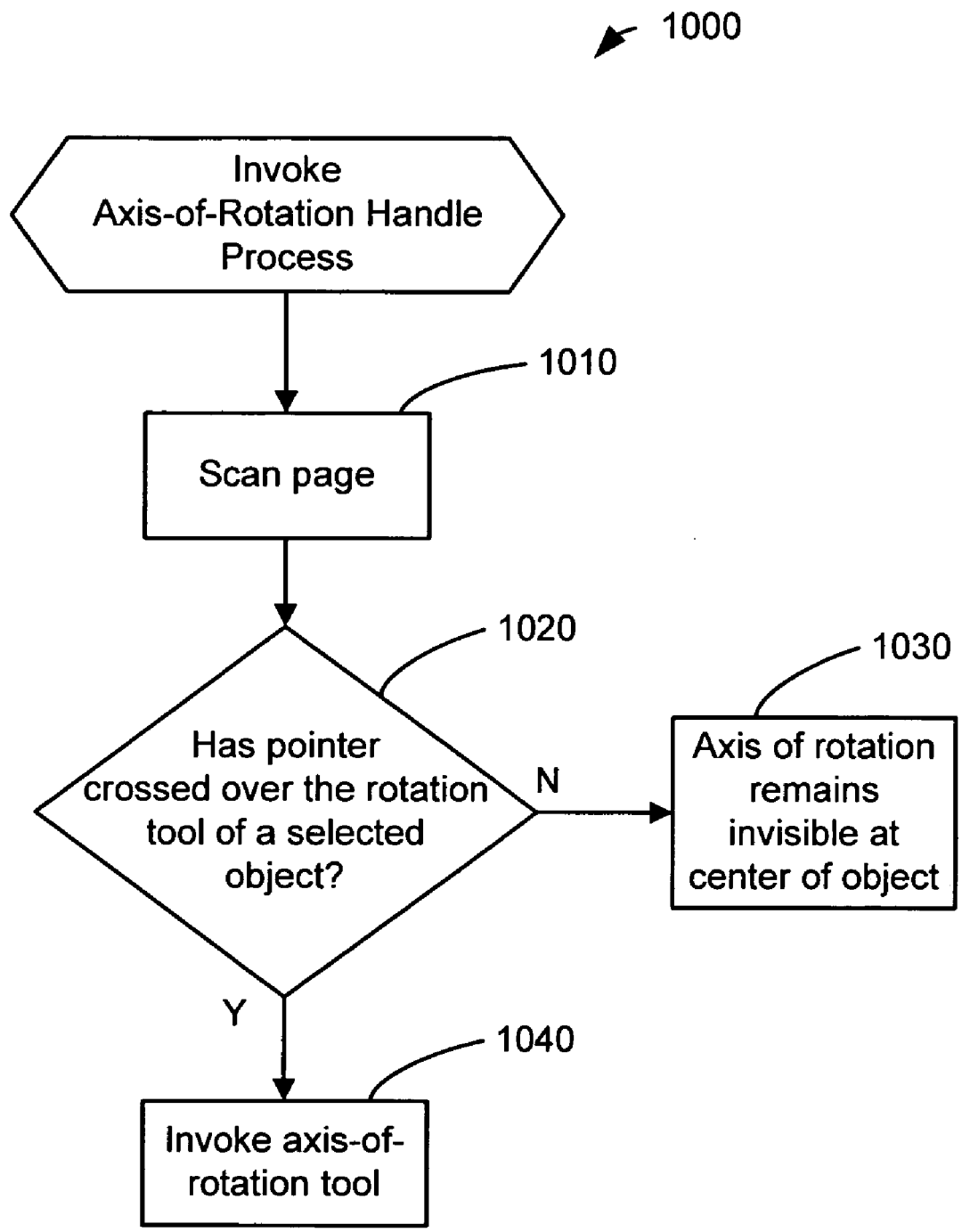
FIG. 10 is a flowchart illustrating an overview of an exemplary process for invoking an axis-of-rotation tool in conjunction with a rotation tool, according to one exemplary embodiment of the present invention.

The default position of the axis of rotation is the center of the object 305. However, a user can adjust this axis of rotation with an axis-of-rotation tool handle. That is, axis of rotation is a manipulation parameter of the rotation tool 330, and the axis-of-rotation tool handle is operative to adjust this manipulation parameter. FIG. 10 illustrates an overview of an exemplary process for invoking the axis-of-rotation tool handle. Subsequent figures illustrate routines, process steps, and functionality related to the rotating an object 305 with a rotation tool handle 330 and an axis-of-rotation tool handle.

FIG. 10 presents a high-level flow chart 1000 for a process titled Invoke Axis-of-Rotation Handle Process. At Step 1010, DV 210, which is illustrated in FIG. 2, scans a displayed page to identify selected objects 310 on the page. More specifically, DV 210 requests for SL 230, which is also illustrated in FIG. 2, to identify the objects that are on the current list of selected objects.

At inquiry Step 1020, after DV 210 identifies a selected object 310, DV 210 determines if the pointer 325 has been positioned over the rotation tool handle 330. In other words, the determination is positive if a user has either paused the pointer 325 over the rotation tool handle 330 or moved simply moved the pointer 325 across the rotation tool handle 330.

If the user has not crossed the pointer 325 over the rotation tool handle 330, then at Step 1030, an axis-of-rotation tool handle (illustrated in subsequent figures) is not invoked. The axis of rotation of the object 305 retains its position at the center of the object 305 and is not visible to the user. In other words, DV 210 does not display an icon on the displayed page at the axis of rotation. DV 210 continues scanning the page to determine if the object's state changes from selected to unselected and if the user moves the pointer 325 over the rotation handle 330.

If the user has crossed the pointer 325 over the rotation tool handle 330, then at Step 1040, DV 210 invokes an axis-of-rotation tool handle so the user can adjust the object's axis of rotation. After invoking an axis-of-rotation tool handle, DV 210 continues scanning the displayed page.

This process 1000 for invoking an axis-of-rotation tool handle helps a new or casual user of a drawing software package to learn the features and functions of the tools that are available to manipulate an object 305. The user is not required to search through a toolbar of pull-down menus or read a passage from a manual in an attempt to identify or locate a tool. The user can perform multiple operations on an object 305 based on intuition and without moving the pointer 325 away from the vicinity of the object 305.

Figure 11:
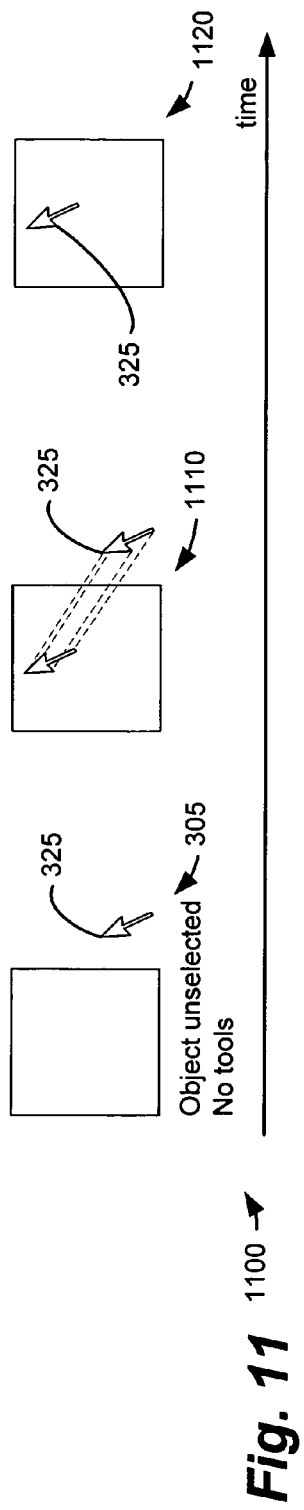
FIG. 11 is a graphic sequence illustrating an exemplary scenario of moving a pointer over an unselected object without invoking an axis-of-rotation tool, according to one exemplary embodiment of the present invention.

FIG. 11 illustrates an exemplary sequence of a user moving a pointer 325 over an unselected object 305 without invoking an axis-of-rotation tool handle. At Step 305, the object 305 is unselected and the pointer 325 is positioned off of the object 305. This state corresponds to time $t_{-a}$ in the timing diagram 300 presented in FIG. 3, which is described above. At Step 1110, the user moves the pointer 325 over the object 305. At Step 1120, the user pauses the pointer 325 over the object 305. Since no handles are present and the object 305 is not selected, the actions in the sequence do not invoke any handle-based toolsets.

Figure 12:
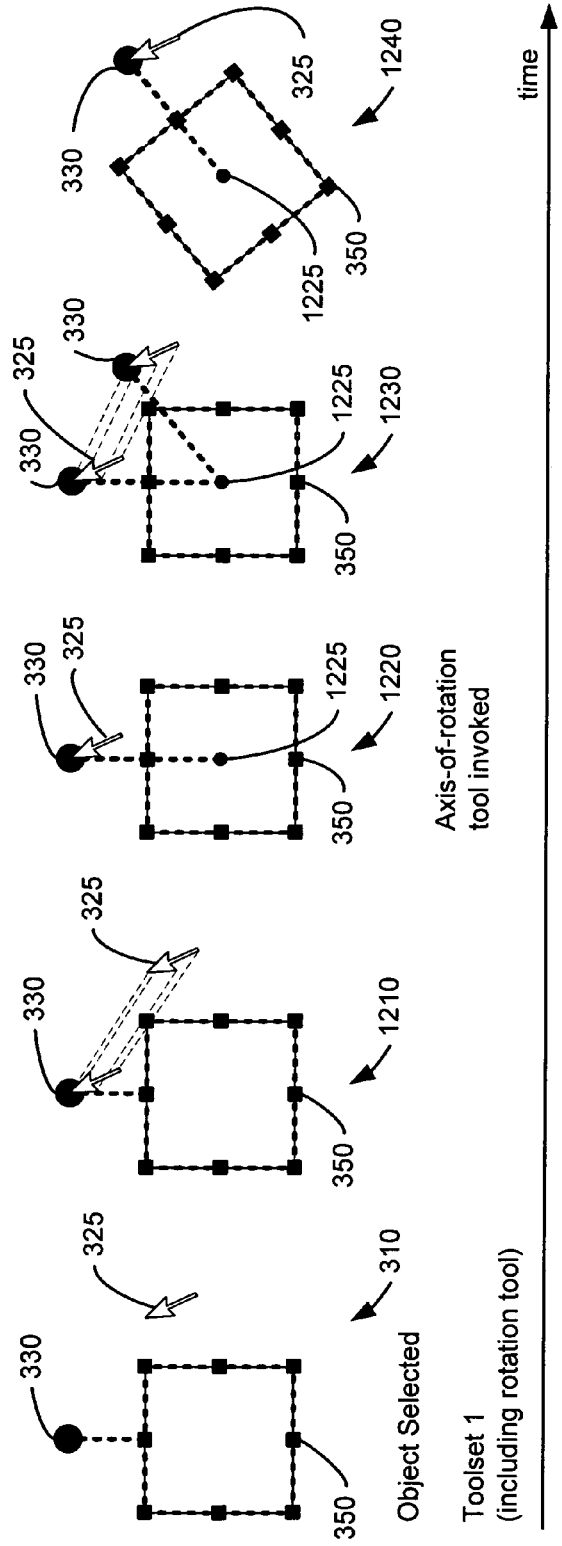
FIG. 12 is a graphic sequence illustrating an exemplary scenario of moving a pointer over the rotation tool of an object with exemplary Toolset One invoked, wherein the pointer position invokes an axis-of-rotation tool and further illustrating the functionality of the rotation tool and the axis-of-rotation tool, according to one exemplary embodiment of the present invention.

FIG. 12 illustrates an exemplary sequence 1200 of a user moving a pointer 325 onto a rotation tool handle 330 of a selected object 310, invoking an axis-of-rotation tool handle 1225, and rotating the object 305 about the default axis of rotation 1225.

At Step 310, the object 305 is selected with Toolset One 310, which includes shape-level handles 350 and a rotation tool handle 330, invoked. The pointer 325 is positioned off of the object 305. This state corresponds to time $t_{-b}$ in the timing diagram 300 presented in FIG. 3.

At Step 1210, the user moves the pointer 325 over the rotation tool handle 330 and pauses the pointer 325. This pointer gesture immediately invokes the axis-of-rotation tool handle 1225, as illustrated at Step 1220. At Step 1230, the user clicks on the rotation tool handle 330, for example by depressing a button on a mouse, and moves the handle 330 clockwise. DV 210 rotates the object 1240 about the default axis of rotation 1225 in response to the gesture of moving the handle 330. DV 210 presents the rotated object on the display without time lag that would be perceptible to a human user. At Step 1240, the user stops the motion of the pointer 325 and releases the mouse button. As depicted in Step 1240, this pointer gesture reorients the object 305 into a rotated state.

Figure 13:
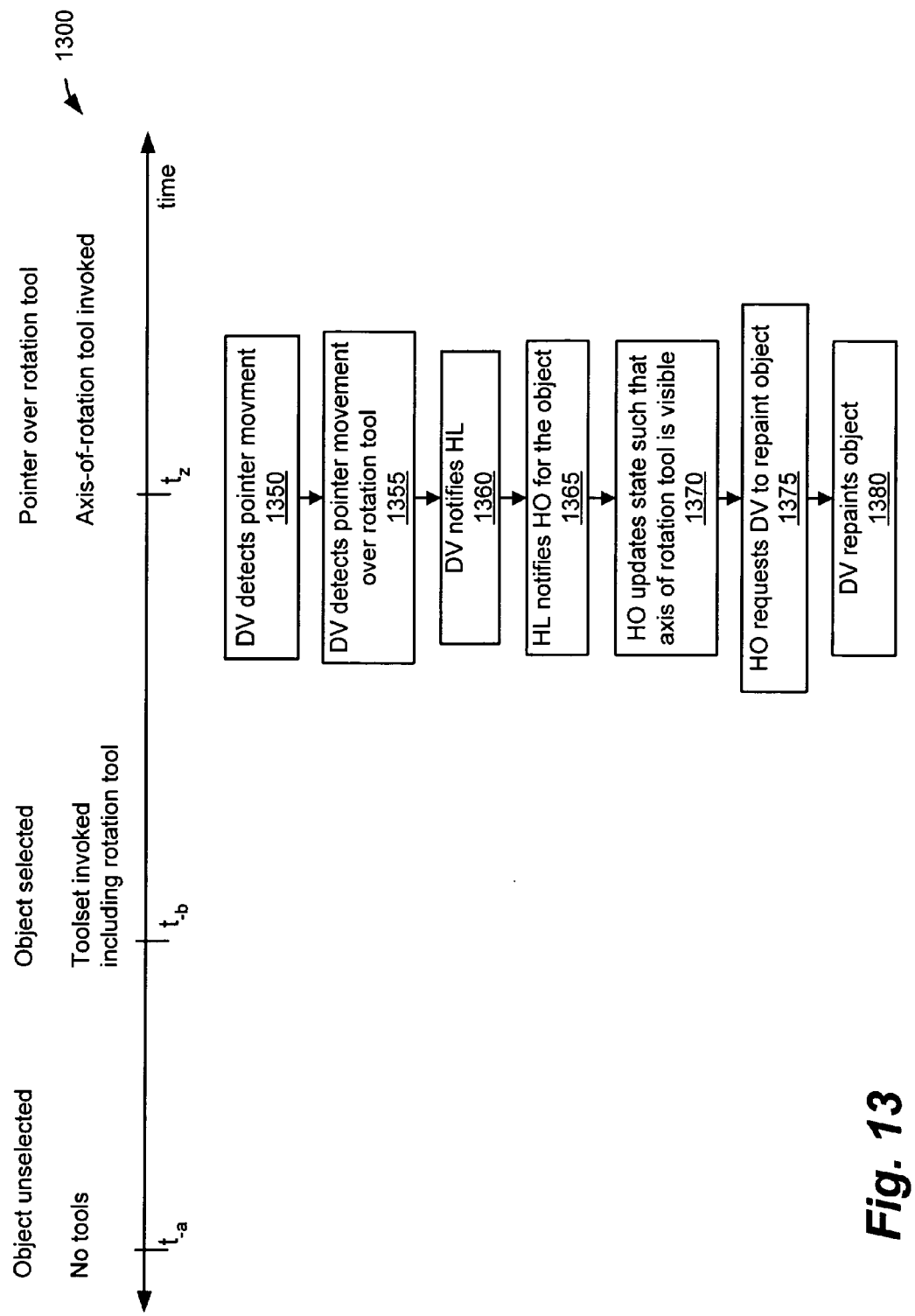
FIG. 13 illustrates exemplary process steps associated with a timing diagram of a sequence for invoking an axis-of-rotation tool, generally corresponding to a portion of the sequence illustrated in FIG. 12, according to one exemplary embodiment of the present invention.

FIG. 13 illustrates a timing diagram 1300 that presents exemplary steps associated with the sequence 1200 presented in FIG. 12. Time t-a on the timing diagram 1300 corresponds to a point in time prior to the sequence presented in FIG. 12 when the object 305 is unselected and does not have any tool handles. This point in time corresponds to time t-a on the timing diagram 300 of FIGS. 3 and 5, which are described above. Therefore, steps listed on FIG. 5 under time $t_{-a}$ are generally applicable to time $t_{-a}$ on the timing diagram 1300 of FIG. 13.

Time $t_{-b}$ on the timing diagram 1300 of FIG. 13 corresponds to Step 1210 on FIG. 12 and to time t-b of the timing diagram 300 of FIGS. 3 and 5. Consequently, the steps 505-525 that are listed under time t-b of the timing diagram 300 of FIG. 5 are also exemplary steps for time t-b of the timing diagram 1300 of FIG. 13. At time $t_{-b}$, the object 305 is selected and Toolset One 310, including the rotation tool handle 330, is invoked.

Time $t_c$ on the timing diagram 1300 of FIG. 13 generally corresponds to Steps 1220 and 1230 on FIG. 12. The pointer 325 is positioned over the rotation tool handle 330 and the axis-of-rotation tool handle 1225 is invoked. This condition triggers Steps 1350-1380, which are generally performed by the elements illustrated in FIG. 2 and described above.

At Step 1350, DV 210 detects pointer movement. At Step 1355, DV 210 detects that the pointer 325 is positioned over the rotation tool handle 330. At Step 1360, DV 210 notifies HL 220 that the pointer 325 is over the rotation handle 330. At Step 1365, HL 220 notifies HO 240 of the state of the object 305. At Step 1370, HO 240 updates the state of the object 305 so that the axis-of-rotation tool handle 1225 is visible on the displayed page. At Step 1375, HO 240 requests for DV 210 to repaint the object 305 on the displayed page. At Step 1380 DV 210 repaints the object 305. With the axis-of-rotation tool handle 1225 invoked, a user can easily adjust an object's axis of rotation and rotate the object 305 about that adjusted axis.

Figure 14A:
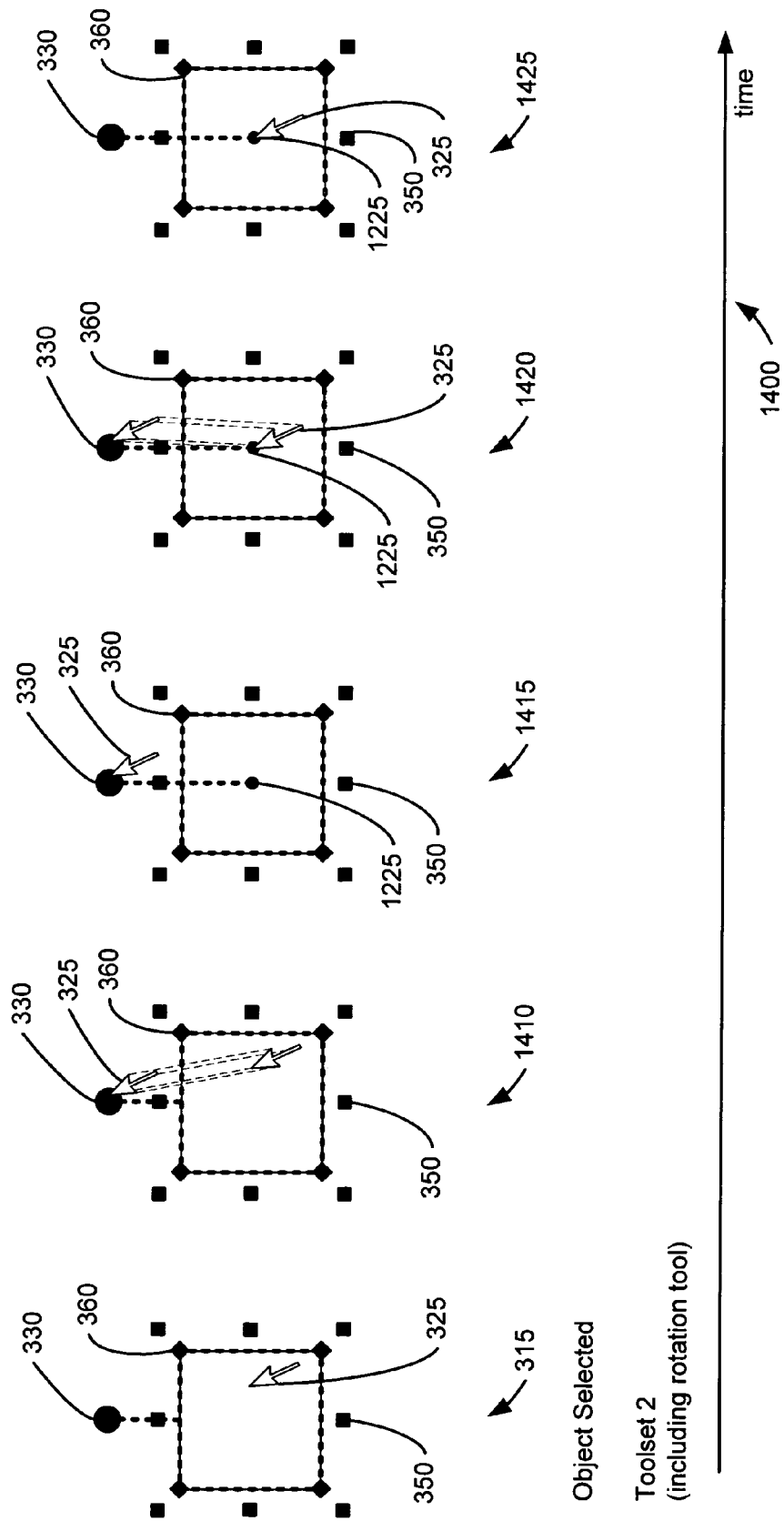
FIG. 14 A-C is a graphic sequence illustrating an exemplary scenario of moving a pointer over the rotation tool of an object with exemplary Toolset Two invoked, wherein the pointer position invokes an axis-of-rotation tool and further illustrating the functionality of the rotation tool and the axis-of-rotation tool, according to one exemplary embodiment of the present invention.
Figure 14B:
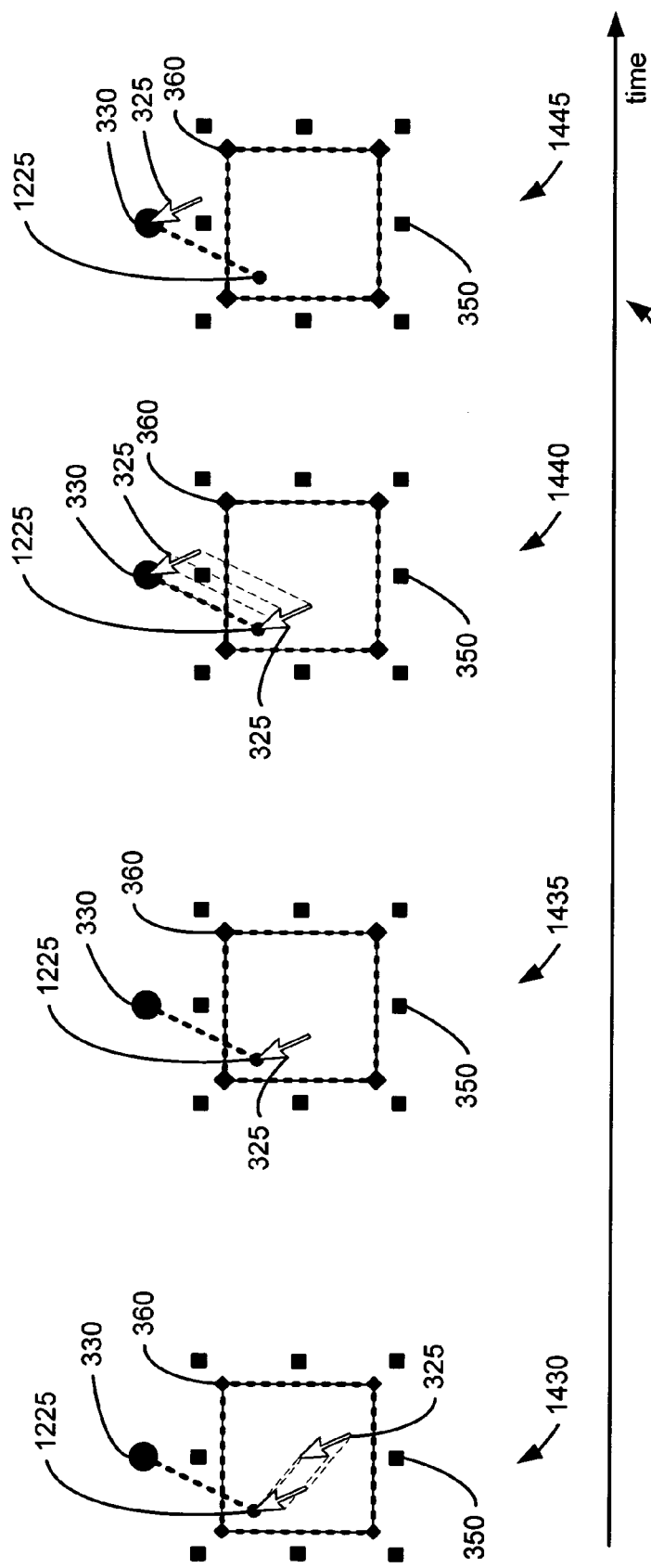
Figure 14C:
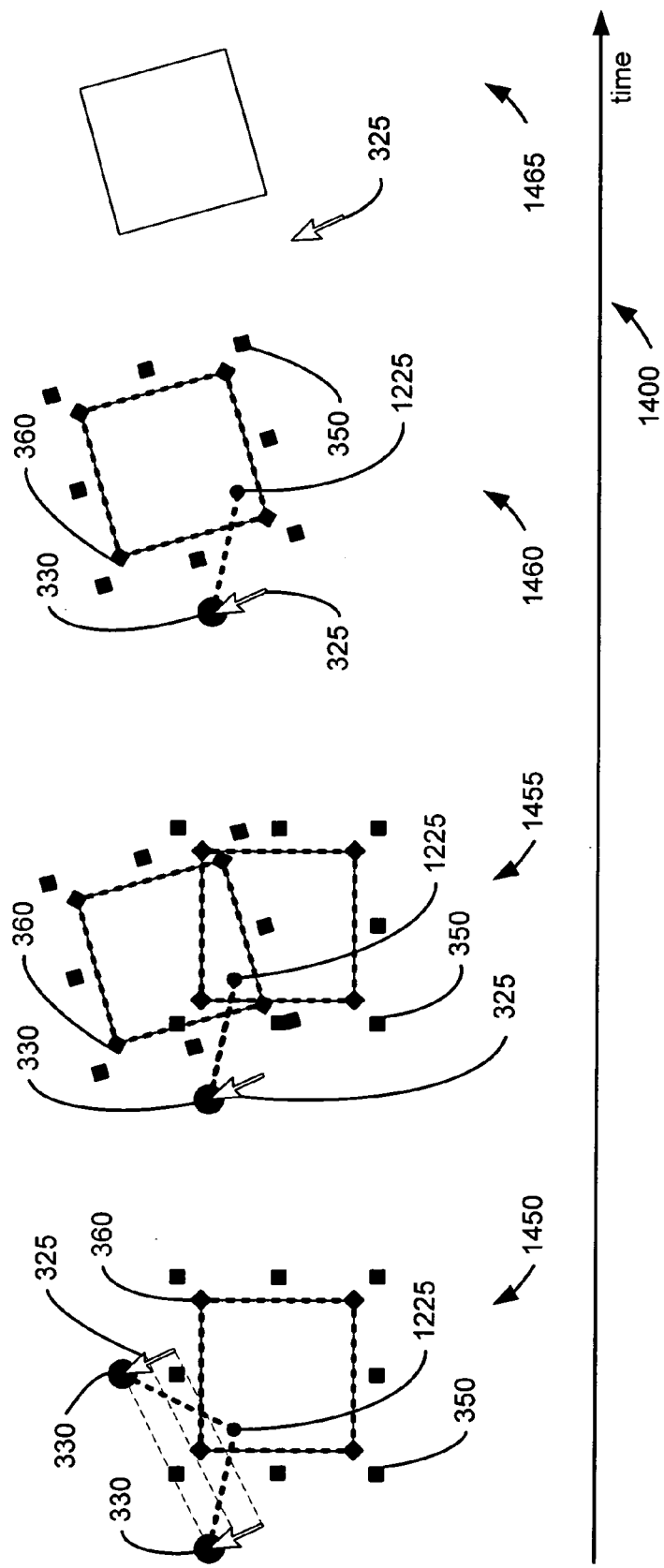

FIGS. 14A-C illustrate an exemplary sequence of a user invoking the axis-of-rotation tool handle 1225 and using it in conjunction with the rotation tool 330 to manipulate an object 305.

Referring now to FIG. 14A, the first step 315 on the timing diagram 1400 generally corresponds to time $t_1$ on the timing diagram 300 presented on FIG. 3. At that point, the object is selected, Toolset One 310 and Toolset Two 315 are invoked, and the pointer 325 is positioned over the selected object 310. In this state, the timer accumulates time towards invoking Toolset Three 320. At Step 1410, the user moves the pointer 325 over the rotation tool handle 330 and pauses the pointer 325 in that position. This pointer gesture stops the timer and thus prevents Toolset Three 320 from being invoked. This pointer gesture also invokes, at Step 1415, the axis-of-rotation tool handle 1225 in its default position at the center of the object 305. At Step 1420, the user moves the pointer 325 over the axis-of-rotation tool handle 1225. At Step 1425, the user clicks the pointer 325 on the axis-of-rotation tool handle 1225. FIG. 14B illustrates subsequent steps in the sequence 1400.

Referring now to FIG. 14B, at Step 1430 the user moves the pointer 325 while maintaining the click in the depressed position, thereby using the axis-of-rotation tool handle 1225 to adjust the object's axis-of-rotation 1225. At Step 1435, the user releases the click thereby setting the position of the axis of rotation 1225 into its adjusted position 1225. At Step 1440, the user moves the pointer 325 over the rotation tool handle 330. At Step 1445, the user pauses the pointer 325 over the rotation tool handle 330 and clicks the pointer 325. FIG. 14C illustrates subsequent steps in the sequence 1400.

Referring now to FIG. 14C, at Step 1450, the user engages the rotation tool handle 330 by moving the pointer 325 while maintaining the click in the depressed state. This gesture moves the rotation tool handle 330 counterclockwise. At Step 1455, the object 305 responds to the user's pointer inputs to the rotation tool handle 330 and the axis-of-rotation tool handle 1225. The object 305 rotates about the user-specified axis of rotation by a degree of rotation that corresponds to the user's displacement of the rotation tool handle 330. At Step 1460 the user releases the pointer click to set the object 305 into its rotated position. At Step 1465, the user moves the pointer 325 away from the rotated object and deselects it.

Figure 15:
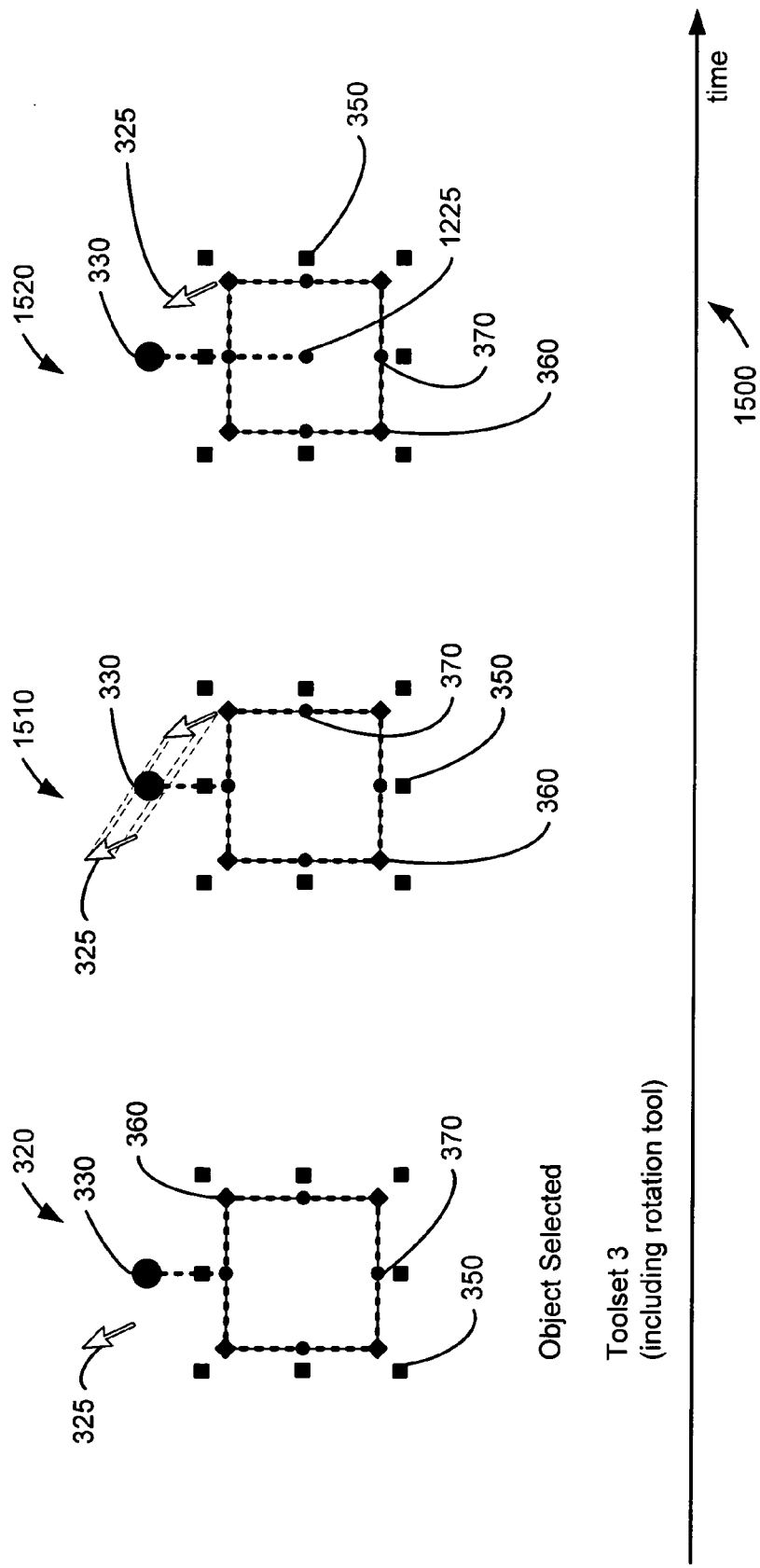
FIG. 15 is a graphic sequence illustrating an exemplary scenario of moving a pointer over the rotation tool of an object with exemplary Toolset Three invoked, wherein the pointer position invokes an axis-of-rotation tool and further illustrating functionality of the rotation tool and the axis-of-rotation tool, according to one exemplary embodiment of the present invention.

FIGS. 14A-C illustrate an exemplary sequence of a user invoking and using an axis-of-rotation tool handle 1225 on an object 305 that has Toolset One 310 and Toolset Two 315 invoked. FIG. 15 illustrates an exemplary sequence of a user invoking an axis-of-rotation tool handle 1225 on an object 305 that has Toolsets One, Two, and Three 310, 315, 320 invoked.

Referring now to FIG. 15, at the first step 320 in the sequence 1500, the object 305 is in a selected state with Toolsets One, Two, and Three 310, 315, 320 invoked including a rotation tool handle 330. At Step 1510 the user passes the pointer 325 over the rotation tool handle 330 without pausing the pointer. This pointer gesture invokes the axis-of-rotation tool handle 1225 at Step 1520, thereby enabling the user to rotate the object 305 about a user-specified axis of rotation.

Figure 16:
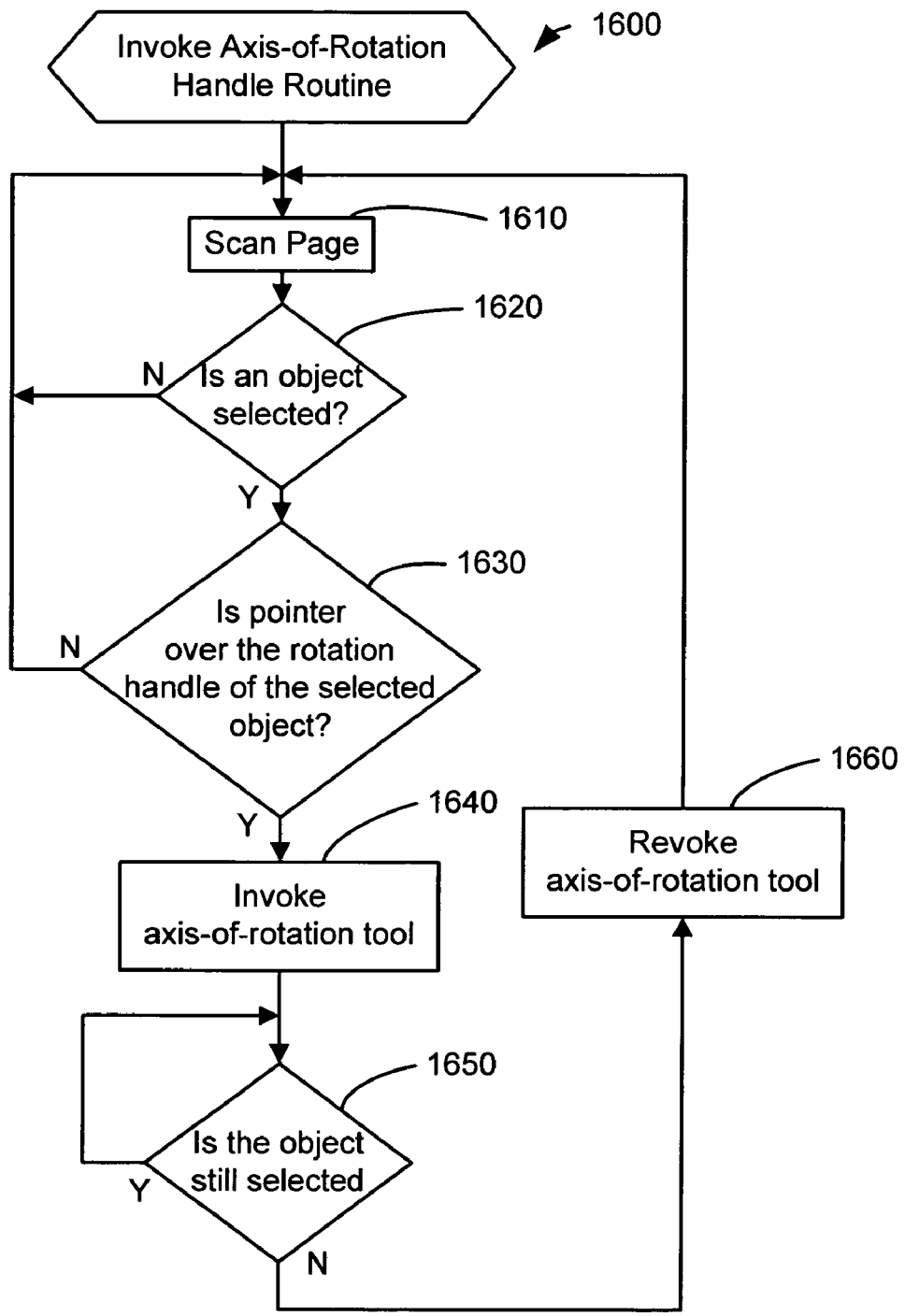
FIG. 16 illustrates a flowchart of an exemplary routine for invoking an axis-of-rotation tool, generally corresponding to the process illustrated in FIG. 10, according to one exemplary embodiment of the present invention.

FIG. 16 illustrates an exemplary routine 1600 for invoking an axis-of-rotation tool handle 1225 generally corresponding to the processes illustrated in FIGS. 10-15 and described above. At the first step of the routine 1600, titled Invoke Axis-of-Rotation Handle Routine, DV 210 scans the displayed page for a selected object. At inquiry Step 1620, DV 210 determines if an object is selected. If the page does not contain any selected objects, then DV 210 continues scanning the page.

If DV 210 identifies a selected object, then at inquiry Step 1630 DV 210 determines if the pointer 325 is over the rotation tool handle 330 of the selected object 310. If the pointer 325 is not over the rotation tool handle 330 of a selected object 310, then DV 210 continues scanning the page. If the pointer 325 is over the rotation tool handle 330 of a selected object 310, then at Step 1640 DV 210 invokes the axis-of-rotation tool and its associated handle 1225. At inquiry Step 1650, DV 210 continues to monitor the object 305 to determine if its state changes from selected to unselected. If a user deselects the object, then at Step 1660, DV 210 revokes the axis-of-rotation tool handle 1225 and the flow of Routine 1600 loops back to Step 1610. From that point forward, DV 210 continues to scan the displayed page.

FIGS. 10-16 describe invoking an axis-of-rotation tool handle in response to interaction between a pointer 325 and a rotation tool handle 330. More generally, the present invention supports interacting a pointer 325 with a first tool handle to invoke a second tool handle. In one embodiment of the present invention, the first tool handle provides functionality that is distinct from the second tool handle. The second tool handle can also be operative to adjust a manipulation parameter of the first tool handle, such as the axis of rotation of the rotation tool handle 330. In one embodiment of the present invention, the second tool handle is operative to provide additional finesse to the functionality of the first tool handle. In one embodiment of the present invention, the second tool handle is operative to allow a user to refine an operation that is performed by the first tool handle. In one embodiment of the present invention, the second tool handle provides supplemental functionality to the first tool handle.

Those skilled in the computer-based drawing arts recognize that exemplary Routine 1600, like the other exemplary processes, timing diagrams, and routines described above, supports providing a user with a variety of tools and invoking these tools in a variety of manners conducive to using them intuitively.

CONCLUSION

In summary, the present invention supports providing a user of a software program with tools that are intuitive so that a user can become proficient with minimal training and experience. The present invention supports invoking and accessing multiple toolsets for performing a variety of operations on an object using a pointer while maintaining the pointer in the vicinity of the object. By pausing a pointer over an object, a user can initiate an evolution of handle-based tools. The present invention also supports invoking supplemental functionality for a tool by positioning a pointer over the tool. By positioning a pointer over a rotation tool, a user can invoke an axis-of-rotation tool that provides functionality beyond the base rotation tool.

From the foregoing, it will be appreciated that the preferred embodiment of the present invention overcomes the limitations of the prior art. From the description of the preferred embodiment, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A computer method for providing tools for manipulating an object on a display device using a pointer comprising:
    displaying an object on a display device;
    determining if the object has been selected;
    displaying a first toolset if the object has been selected, the first toolset providing a first set of handles for manipulating the object;
    determining if the pointer is stationary over the object;
    if the pointer is stationary over the object for a threshold length of time, displaying a second toolset, the second toolset providing a second set of handles for manipulating the object differently from the manipulation of the first set of handles while maintaining accessibility of the first toolset, wherein maintaining accessibility of the first toolset comprises repositioning the first toolset to provide space on the display device for the second toolset;

when a first handle of the first toolset is selected, performing a manipulation on the object in accord with the first handle; and when a second handle of the second toolset is selected, performing a manipulation on the object in accord with the second handle;

wherein the threshold length of time is a first threshold length of time and wherein the method further comprises the step of if the pointer is stationary over the object for a second threshold length of time, displaying a third toolset, the third toolset providing a third set of handles for manipulating the object differently from the manipulation of the first set of handles and from the manipulation of the second set of handles.

2. The computer method of claim 1, further comprising the step of if the third toolset is displayed, maintaining accessibility of the first toolset and the second toolset.

3. The computer method of claim 1, wherein the first set of handles are operative to resize the object.

4. The computer method of claim 1, further comprising the steps of:

displaying a rotation tool operative to rotate the object about an axis of rotation; and if the pointer is over the rotation tool, displaying an axis-of-rotation tool, operative to adjust the axis of rotation.

5. A computer-readable medium having computer executable instructions for performing steps comprising:

displaying a graphic on a display;
displaying a pointer on the display;
identifying a position of the graphic on the display;
identifying a position of the pointer on the display;
displaying a first toolset, the first toolset providing a first set of handles operative to perform a first type of operation on the graphic;

if the pointer is positioned over the graphic for a threshold length of time, displaying a second toolset, the second toolset providing a second set of handles operative to perform a second type of operation on the graphic while maintaining accessibility of the first toolset, wherein maintaining accessibility of the first toolset comprises repositioning the first toolset to provide space on the display device for the second toolset;

when a user interacts the pointer with a first handle of the first toolset, performing the first type of operation on the graphic; and when the user interacts the pointer with a second handle of the second toolset, performing the second type of operation on the graphic;

wherein the threshold length of time is a first threshold length of time and wherein the method further comprises the step of if the pointer is stationary over the object for a second threshold length of time, displaying a third toolset, the third toolset providing a third set of handles for manipulating the object differently from the manipulation of the first set of handles and from the manipulation of the second set of handles.

6. The computer-readable medium of claim 5, wherein the step of displaying a first toolset further comprises:

determining if the graphic changes from an unselected state to a selected state and if the graphic is in the selected state, displaying a first toolset.

7. The computer-readable medium of claim 5, wherein the first type of operation comprises manipulating the graphic and wherein the second type of operation comprises adjusting a manipulation parameter of the graphic.

8. The computer-readable medium of claim 7, wherein the first type of operation comprises rotating the graphic about an axis of rotation and wherein the second type of operation comprises adjusting the axis of rotation.

9. A system for providing tools for manipulating an object using a pointer comprising:

a component that displays the object and a first toolset, the first toolset providing a first set of handles for manipulating the object;

a component that, when the pointer is stationary over the object for a threshold length of time, displays a second toolset, the second toolset providing a second set of handles for manipulating the object differently from the manipulation of the first set of handles, wherein the accessibility of the first toolset is maintained while the second toolset is displayed and wherein maintaining accessibility of the first toolset comprises repositioning the first toolset to provide space for the second toolset;

a component that, when a user interacts the pointer with a first handle of the first toolset, performs a manipulation on the object in accord with the first handle; and a component that, when the user interacts the pointer with a second handle of the second toolset, performs a manipulation on the object in accord with the second handle;

wherein the threshold length of time is a first threshold length of time and wherein the system further comprises a component that, when the pointer is stationary over the object for a second threshold length of time, displays a third toolset, the third toolset providing a third set of handles for manipulating the object differently from the manipulation of the first set of handles and from the manipulation of the second set of handles, wherein the accessibility of the first toolset and the second toolset is maintained while the third toolset is displayed.

10. The system of claim 9, further comprising a component that displays a rotation tool operative to rotate the object about an axis of rotation and that, when the pointer is over the rotation tool, displays an axis-of-rotation tool, operative to adjust the axis of rotation.

* * * * *